United States Patent [19]
Lepage et al.

[11] Patent Number: 6,009,424
[45] Date of Patent: Dec. 28, 1999

[54] SIMILARITY SEARCH APPARATUS FOR SEARCHING UNIT STRING BASED ON SIMILARITY

[75] Inventors: Yves Lepage, Kyoto; Shinichi Ando, Nara, both of Japan

[73] Assignee: ATR Interpreting Telecommunications Research Laboratories, Kyoto, Japan

[21] Appl. No.: 08/922,452

[22] Filed: Sep. 3, 1997

[30] Foreign Application Priority Data

Sep. 4, 1996 [JP] Japan ................................ 8-233954

[51] Int. Cl.⁶ .................................................. G06F 17/30
[52] U.S. Cl. ................................... 707/6; 707/5; 707/104
[58] Field of Search ................................ 707/5, 6, 500, 707/104

[56] References Cited

U.S. PATENT DOCUMENTS

| | | | |
|---|---|---|---|
| 5,265,242 | 11/1993 | Fujisawa et al. | 707/3 |
| 5,577,249 | 11/1996 | Califano | 707/100 |
| 5,628,003 | 5/1997 | Fujisawa et al. | 707/104 |
| 5,680,511 | 10/1997 | Baker et al. | 704/257 |
| 5,752,051 | 5/1998 | Cohen | 704/1 |
| 5,787,425 | 7/1998 | Bigus | 707/6 |
| 5,799,301 | 8/1998 | Castelli et al. | 707/6 |
| 5,799,325 | 8/1998 | Rivette et al. | 707/500 |
| 5,884,305 | 3/1999 | Kleinberg et al. | 707/6 |

OTHER PUBLICATIONS

H.D. Cheng; "VLSI Architectures for String Matching and Pattern Matching"; Pattern Recognition, vol. 20. No. 1, 1987; pp. 125–141.

W.I. Chang et al.; "Sublinear Approximate String Matching and Biological Applications"; Algorithmica, vol. 12, No. 4/05, Oct. 1994; pp. 327–344.

Nadia El–Mabrouk; "Boyer–Moore Strategy to Efficient Approximate String Matching"; Combinatorial Pattern Matching Annual Symposium Proceedings, Jun. 1996; pp. 24–38.

William I. Chang et al.; "Approximate String Matching in Sublinear Expected Time"; Proceedings of the Annual Symposium on Foundations of Computer Scie, St. Louis, Oct. 22–24, 1990, vol. 1, pp. 116–124.

(List continued on next page.)

*Primary Examiner*—Wayne Amsbury
*Assistant Examiner*—Jean Bolte Fleurantin

[57] ABSTRACT

Provided is a similarity search apparatus for searching data at a higher speed than that of the prior art without limiting the types of letter of a search key. A unit position correspondence memory stores therein a table that expresses the ordinal number among units at which each unit in a search key inputted by means of a keyboard has appeared within the search key. A search section refers to the table stored in the unit position correspondence memory and operates every time units are read out one by one from a database memory including a plurality of units to generate a plurality of status parameters each of which includes a similarity, a position of coincidence and a skip number, which express with what number of units from the top of the search key the units read out from the database have coincided at what degree of similarity, and express how many units in the database have been skipped over subsequently. Through the above process, the search section updates each status parameter stored in a status parameter memory and operates upon detecting a unit string coincident at a similarity equal to or lower than an inputted similarity, to output the detected unit string as a unit string of a similarity.

22 Claims, 18 Drawing Sheets

OTHER PUBLICATIONS

Raghu Sastry et al.; "CASM: A VLSI Chip for Approximate String Matching"; IEEE Transactions on Pattern Analysis and Machine Intelligence, vol. 17, No. 8, Aug. 1, 1995; pp. 824–830.

Sun Wu et al.; "Text Searching Allowing Errors"; Communications of the Ass'n. for Computing Machinery, vol. 35, No. 10, Oct. 1, 1992; pp. 83–91.

Robert A. Wagner et al.; "The String–to–String Correction Problem", Journal of the Association for Computing Machinery, vol. 21, No. 1, Jan. 1974; pp. 168–173.

Stanley M. Selkow; "The Tree–to–Tree Editing Problem", Information Processing Letters; vol. 6, No. 6; Dec. 1977; pp. 184–186.

Yves Lepage et al.; "A First Quantitative Analysis of Approximate Pattern–Matching"; Proceedings of Japanese Society for Artificial Intelligence, The Special Interest Group (SIG)–J–9501–4; Dec. 8, 1995; pp. 17–23.

*Fig.2A*   Example of Serial Number Table

| Unit | a | b | c | d |
|---|---|---|---|---|
| Serial Number | 0 | 1 | 2 | 3 |

*Fig.2B*   Example of Unit Number Table

| Serial Number | 0 | 1 | 2 | 3 |
|---|---|---|---|---|
| Number of Units | 2 | 1 | 1 | 1 |

*Fig.2C*   Example of Start Position Table

| Serial Number | 0 | 1 | 2 | 3 |
|---|---|---|---|---|
| Start Position | 1 | 4 | 6 | 8 |

*Fig.2D*   Example of Unit Position Table

| Serial Number | 0 | 1 | 2 | 3 | 4 | 5 | 6 | 7 | 8 | 9 |
|---|---|---|---|---|---|---|---|---|---|---|
| Unit Position | 0 | 4 | 1 | 0 | 2 | 0 | 3 | 0 | 5 | 0 |

When "d" read out from Database in Database Memory 3 is made to coincide with "d" in Search key:

When "d" read out from Database in Database Memory 3 is not made to coincide with "d" in Search key:

SIMILARITY SEARCH APPARATUS FOR SEARCHING UNIT STRING BASED ON SIMILARITY

BACKGROUND OF THE INVENTION

1. Field of the Invention

The present invention relates to a search apparatus, and in particular, to a similarity search apparatus for searching a string made of units (referred to as a unit string hereinafter) whose distance defined by the minimum number of editing operations becomes a value of not greater than a predetermined threshold value. In this case, the unit is a character, a letter, a word or the like.

2. Description of the Prior Art

Conventionally, as a similarity between a letter string and a letter string, there has been proposed a method for calculating a minimum edition cost. For example, a first prior art document of "R. A. Wagner et al., "The String-to-String Correction Problem", Journal of the ACM, Vol. 21, No. 1, pp. 168–172, 1974" has proposed a method for calculating the number of editing operations required for putting two letter strings into identical letter strings as a measure of similarity in terms of replacement, deletion and insertion in units of letters defined as an editing operation (this method referred to as a first prior art hereinafter). It is now considered the similarity between, for example, a letter string "abcd"and a letter string "ace". According to the first prior art method, the letter string "abcd" can be transformed into the letter string "ace"by deleting the letter "b" and replacing the letter "d" with "e", and therefore, the similarity between the two letter strings can be calculated as two.

Likewise, a second prior art document of "S. M. Selkow et al., "The Tree-to-Tree Editing Problem", Information Processing Letters, Vol. 6, No. 6, pp. 184–186, 1977" has proposed a method for calculating the similarity between tree structures in terms of replacement, deletion and insertion in units of nodes defined as editing operation (this method referred to as a second prior art hereinafter).

Further, a method for executing similarity search with the minimum number of editing operations defined as a similarity and applying it to letter correction or the like has been disclosed in a third prior art document of "Sun Wu et al., "Fast Text Searching Allowing Errors", Communications of The ACM, Vol. 35, No. 10, pp. 83–91, October, 1992", proposing a similarity search method with the minimum number of editing operations defined as a similarity (this method referred to as a third prior art hereinafter). According to this third prior art method, first of all, partial search keys obtained by equally dividing a search key into "predetermined threshold value +1" units are used for search on the basis of complete coincidence. In order that a similarity between a certain symbol string and a search key shall become a value of not greater than a predetermined threshold value, any of the partial search keys is required to be included in the symbol string. Therefore, by executing similarity calculation only on the proximity of an obtained result, a similarity search result can be obtained. In particular, because the whole process is implemented by bit processing, it has had the advantage that it operates at relatively high speed.

However, since the third prior art executes comparison by bit processing, it preparatorily limits the letters that can constitute a search key. In the third prior art document, the search key is limited to the alphabet. Therefore, it is very difficult to apply this method to the similarity search of Japanese having a number of types of character or to the similarity search of a word string to be executed with words defined as edition units. Furthermore, it is also possible to know the result without executing comparison to the last of the search key in a certain condition. Moreover, in the third prior art method, there has been the problem that no result can be obtained until the execution of calculation to the last of the search key is completed.

SUMMARY OF THE INVENTION

An essential object of the present invention is therefore to provide a similarity search apparatus capable of executing search at a higher speed than that of the prior art without limiting the types of letter of a search key.

In order to achieve the above-mentioned objective, according to one aspect of the present invention, there is provided a similarity search apparatus for searching a unit string whose similarity defined by a minimum number of editing operations for a predetermined unit becomes a value of not greater than an inputted threshold value with respect to an inputted search key, comprising:

unit position correspondence storage means for storing therein a table expressing an ordinal number among units at which each unit in the inputted search key has appeared within the search key;

preprocessing means for analyzing the inputted search key, generating said table and storing the table into said unit position correspondence storage means;

database storage means for storing therein a database including a plurality of units;

status parameter storage means for storing therein a plurality of status parameters each of which includes a similarity, a position of coincidence and a skip number, which express with what number of units from the top of the search key the units in the database have coincided at what degree of similarity, and express how many units in said database have been skipped over subsequently; and search means for generating said status parameter with reference to the table stored in said unit position correspondence storage means every time the units are read out one by one from said database storage means, updating the status parameters stored in said status parameter storage means and, upon detecting a unit string coincident at a similarity equal to or lower than an inputted similarity, outputting the detected unit string as a unit string of similarity.

Accordingly, there is no limitation on the types of search key, and therefore, it can be easily expanded to the similarity search of Japanese and a word string.

In the above-mentioned similarity search apparatus, the search means preferably detects the existence of a unit string coincident at a similarity equal to or lower than the inputted similarity by operating only when a status parameter expressing a status in which a unit read out from said database coincides with a unit in the search key is generated to compare a maximum value of similarity calculated from a position and a similarity expressed by a newly generated status parameter and a length of the inputted search key with an inputted threshold value.

Therefore, outputting as a consequence of success of search can be effected without checking the search key to the last part thereof. With this arrangement, the similarity search process can be executed at a higher speed than that of the prior arts, when the threshold values grow.

In the above-mentioned similarity search apparatus, the search means preferably suppresses generation of any unnecessary status parameter based on a predetermined condition every transition of status through reading out the units one by one from said database, generates said status parameter with reference to the table stored in said unit position correspondence storage means, and updates the status parameters stored in said status parameter storage means.

Accordingly, any status parameter that has no chance of coincidence is deleted in an early stage to reduce the number of statuses to be calculated, and therefore, the search process can be achieved at a higher speed than that of the prior arts.

In the above-mentioned similarity search apparatus, the search means generates only a status parameter of which sum of the similarity and the skip number does not exceed a predetermined threshold value.

Accordingly, any status parameter that has no chance of coincidence is deleted in an early stage to reduce the number of statuses to be calculated, and therefore, the search process can be achieved at a higher speed than that of the prior arts.

In the above-mentioned similarity search apparatus, the search means generates only a status parameter whose similarity is minimized when a plurality of status parameters of which position of coincidence is identical and skip number is zero can be generated.

Accordingly, any status parameter that has no chance of coincidence is deleted in an early stage to reduce the number of statuses to be calculated, and therefore, the search process can be achieved at a higher speed than that of the prior arts.

In the above-mentioned similarity search apparatus, when a unit subsequent to a coincident unit in a search key in a status previous to a status of a current process coincides with a unit subsequent to a unit in said database, said search means does not execute updating of the status parameter by insertion.

Accordingly, any status parameter that has no chance of coincidence is deleted in an early stage to reduce the number of statuses to be calculated, and therefore, a search can be achieved at a higher speed than that of the prior arts.

In the above-mentioned similarity search apparatus, the unit string is a letter string and each unit constituting said unit string is one letter, and otherwise, the unit string is a word string and each unit constituting said word string is one word.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 2A, 2B, 2C and 2D are diagrams showing examples of tables that are formed by a preprocessing section 2 in connection with a search key "abcad" and stored in a unit position correspondence memory 10 in the similarity search apparatus shown in FIG. 1, wherein FIG. 2A shows an example of a serial number table stored in a serial number table memory 11, FIG. 2B shows an example of a unit number table stored in a unit number table memory 12, FIG. 2C shows an example of a start position table stored in a start position table memory 13, and FIG. 2D shows an example of a unit position table stored in a unit position table memory 14;

FIGS. 14A and 14B are diagrams showing examples in which, even if a unit in a search key appears in a database in the process of the central processing unit 1 of the similarity search apparatus shown in FIG. 1, a lower similarity results when the units are not made to coincide with each other, wherein FIG. 14A shows a process in the case where "d" read out from the database in a database memory 3 is made to coincide with "d" in the search key, and FIG. 14B shows a process in the case where "d" read out from the database in the database memory 3 is not made to coincide with "d" in the search key;

DETAILED DESCRIPTION OF THE PREFERRED EMBODIMENTS

Preferred embodiments of the present invention will be described below with reference to the accompanying drawings.

Figure 1:
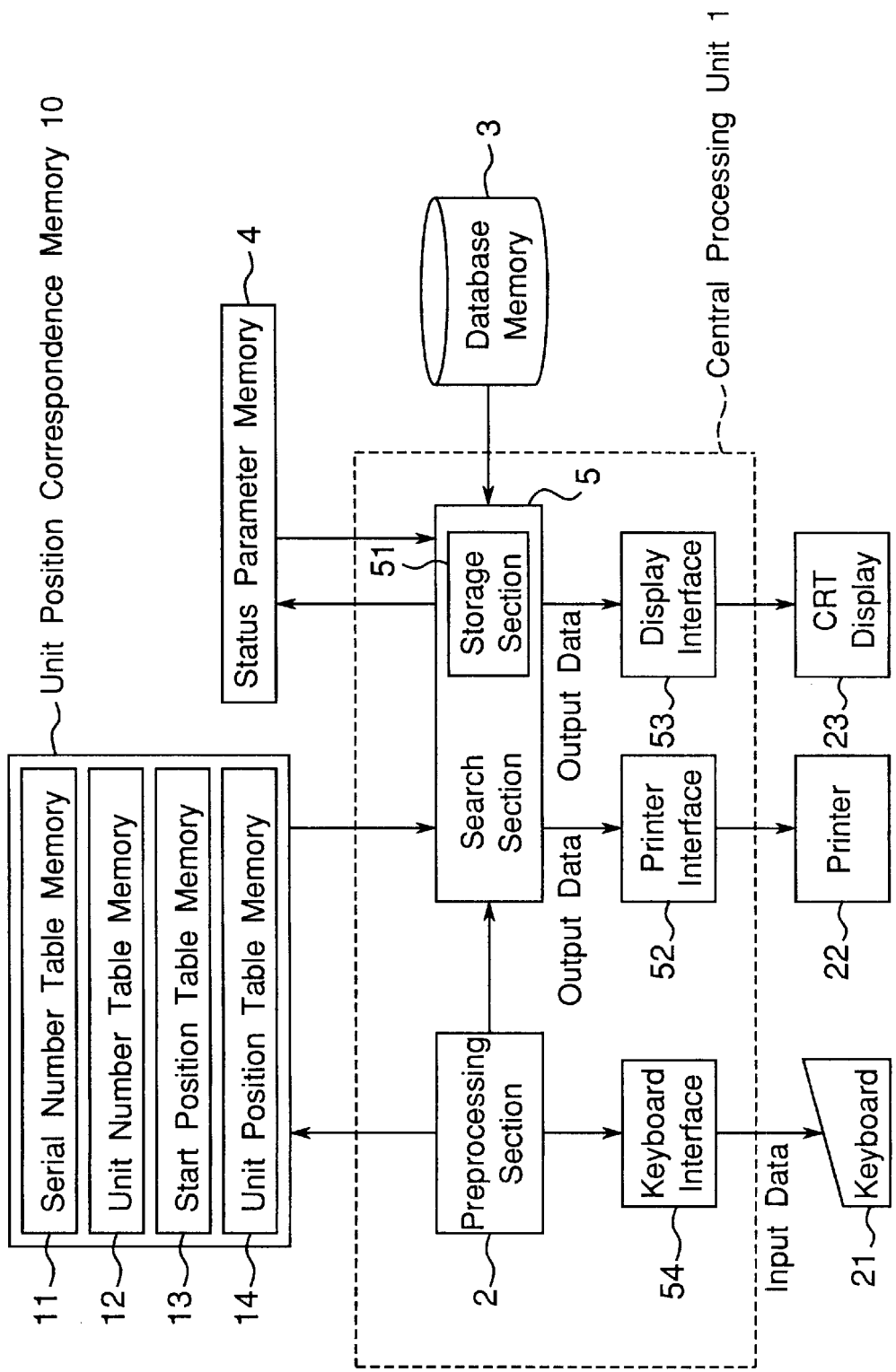
FIG. 1 is a block diagram of a similarity search apparatus according to a preferred embodiment of the present invention.

FIG. 1 is a block diagram of a similarity search apparatus according to a preferred embodiment of the present invention. The similarity search apparatus of the present preferred embodiment is a similarity search apparatus for searching a unit string whose distance defined by the minimum number of editing operations for a predetermined unit becomes a value of not greater than an inputted threshold value with respect to an inputted search key, comprising:

(a) a unit position correspondence memory 10 for storing therein a table expressing the ordinal number among units at which each unit in the search key inputted by means of a keyboard 21 has appeared within the search key;

(b) a preprocessing section 2 for analyzing the inputted search key, generating the above table and storing therein the table into the unit position correspondence memory 10;

(c) a database memory 3 for storing therein a database including a plurality of units;

(d) a status parameter memory 4 for storing therein a plurality of status parameters each of which includes a similarity, a position of coincidence and a skip number, which express with what number of units from the top of the search key the units read out from the database have coincided at what degree of similarity every time units are read out one by one from the database memory 3, and further express how many units in the database have been skipped over subsequently; and (e) a search section 5 which is provided with a storage section 51 for temporarily storing therein the generated status parameters and operates to generate the above status parameters with reference to the table stored in the unit position correspondence memory 10 every time units are read out one by one from the database memory 3, to then update the status parameters stored in the status parameter memory 4 and, upon detecting a unit string coincident at a similarity equal to or lower than an inputted similarity, to output the detected unit string as a unit string of a similarity to a printer 22 via a printer interface 52 or to a CRT display 23 via a display interface 53.

In this case, the search section 5 detects the existence of a unit string coincident at a similarity equal to or lower than the inputted similarity by operating only when a status parameter expressing a status in which the unit read out from the database coincides with a unit in the search key is generated to compare a maximum value of similarity calculated based on the position and a similarity expressed by the newly generated status parameter and the length of the inputted search key with an inputted threshold value. In the present preferred embodiment, the unit to be subjected to similarity search is a Latin letter, and the unit string is a latin letter string or character string. This unit may be a letter, character or word of the other language.

Referring to FIG. 1, a central processing unit or calculation control unit 1 is provided by, for example, a digital computer provided with a CPU for executing a similarity search process for the similarity search apparatus, a ROM (Read Only Memory) for storing therein a program to be executed and data required in executing the program and a RAM (Random Access Memory) which is used as a work area of the CPU, and the central processing unit comprises a preprocessing section 2 and a search section 5 which are connected with each other. In this case, the preprocessing section 2 and the search section 5 may be provided by different digital computers. The preprocessing section 2 is connected to a keyboard 21 for inputting input data of a search key and so forth via a keyboard interface 54 for executing processing of signal conversion and so forth, while the preprocessing section 2 and the search section 5 are connected to the unit position correspondence memory 10 made of, for example, a hard disk memory. The search section 5 is provided by, for example, a RAM, and provided with the storage section 51 for temporarily storing therein the generated status parameter. The search section 5 is connected to the status parameter memory 4 which is provided by, for example, a hard disk memory and stores therein a status parameter. The search section 5 is connected also to the database memory 3 which is provided by, for example, a hard disk memory and stores therein a database including a sentence of a letter string or a word string. The search section 5 is further connected to the printer 22 for printing data of a similarity search result via the printer interface 52 for executing processing such as signal conversion and connected to the CRT display 23 for displaying the data of the similarity search result via the display interface 53 for executing processing such as signal conversion or the like.

The unit position correspondence memory 10 is provided with a serial number table memory 11, a unit number table memory 12, a start position table memory 13 and a unit position table memory 14. FIGS. 2A, 2B, 2C and 2D are diagrams showing examples of tables that are formed by the preprocessing section 2 in connection with a search key "abcad" and stored in the unit position correspondence memory 10 in the similarity search apparatus shown in FIG. 1.

FIG. 2A is a diagram showing an example of a serial number table stored in the serial number table memory 11. In order to provide seriated numbers by indexing each letter included in the search key (the numbers each being referred to as a serial number hereinafter), the serial number for each letter included in the search key is stored as a file table in the serial number table memory 11.

FIG. 2B is a diagram showing an example of a unit number table stored in the unit number table memory 12. In order to state how many corresponding letters will appear in the search key from the serial number given to each letter included in the search key, a unit number expressing how many corresponding letters will appear in the search key with respect to each serial number in the serial number table memory 11 is stored as a file table in the unit number table 12.

FIG. 2C is a diagram showing an example of a start position table stored in the start position table memory 13. In order to designate an input start position of the unit position table based on the serial number given to each letter included in the search key, the input start position (entry position or start position) of the unit position table with respect to the serial number given to each letter included in the search key is stored as a file table in the start position table. In this case, so as to allow the unit positions to be controlled collectively every letter by the unit position table, start positions are set and stored at intervals of the number of appearance of each letter in the search key plus one (delimiter). In this case, the delimiter is to delimit the boundaries of each letter, and practically each start position is determined with reference to the number of appearance of each letter in the search key, the number stated in the unit number table (See FIG. 6).

FIG. 2D is a diagram showing an example of a unit position table stored in the unit position table memory 14. In order to express the ordinal number among units at which each unit has appeared in a search key in a unit position table making process, a unit position corresponding to the serial number of each letter included in the search key is stored as a file table in the unit position table. In this case, the unit positions are grouped by letter so as to be controlled in descending order. The unit position is practically determined with reference to the search key (See FIG. 7).

Figure 3:
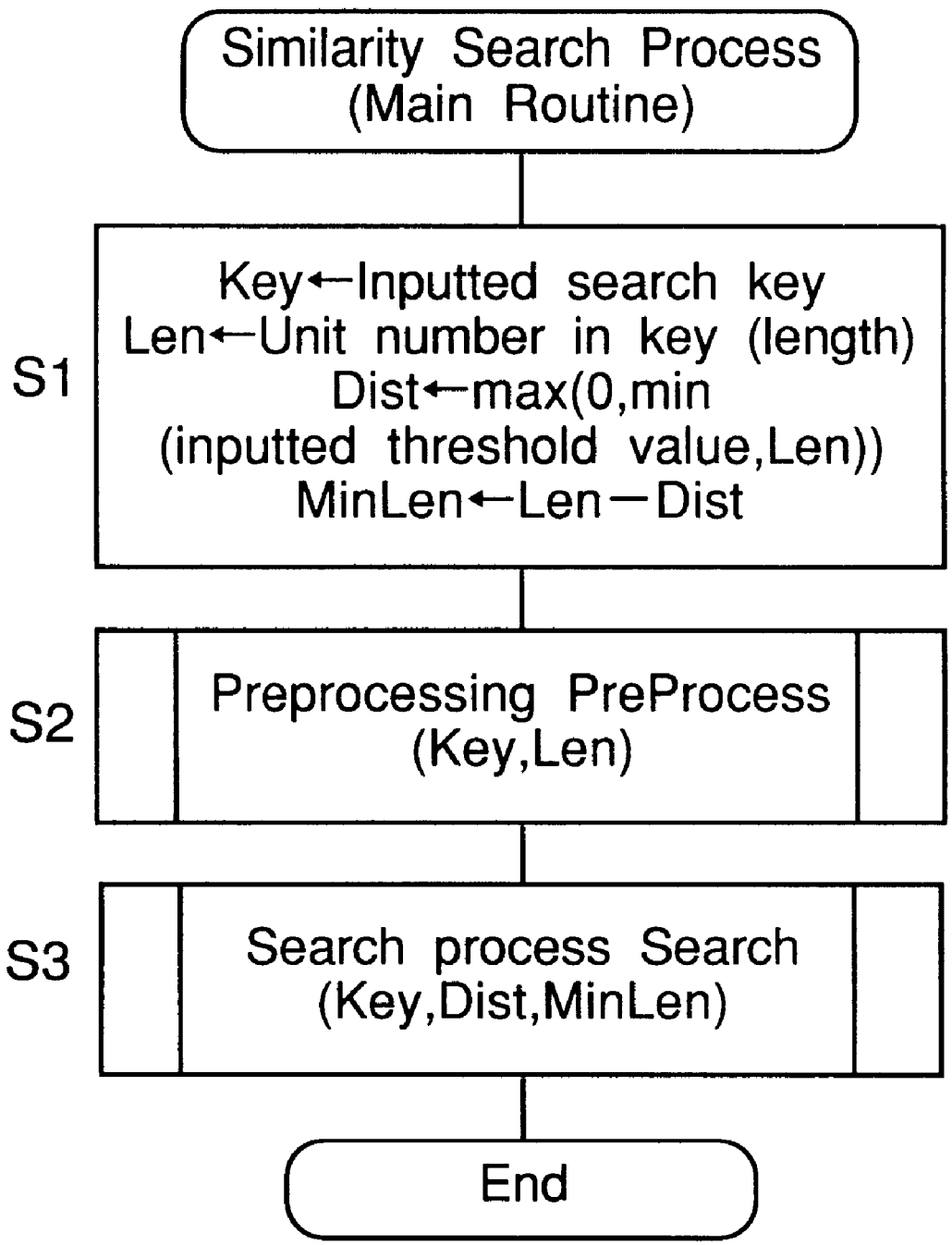
FIG. 3 is a flowchart showing a similarity search process which is executed by a central processing unit 1 of the similarity search apparatus shown in FIG. 1.

FIG. 3 is a flowchart showing a similarity search process which is executed by the central processing unit 1 of the similarity search apparatus shown in FIG. 1.

Referring to FIG. 3, first of all, in step S1, a search key comprised of a letter string inputted by means of the keyboard 21 is substituted into the search key Key, and the number (length) of units of the letter string of the search key Key of a sentence or the like stored in the database in the database memory 3 is substituted into the length Len. Further, the minimum value of a threshold value representing the upper limit of a tolerated similarity inputted by means of the keyboard 21 and the above length Len is taken, the maximum value max (0, min (inputted threshold value, Len)) of the minimum value and zero is substituted into a distance Dist, and a subtraction result obtained by subtracting the distance Dist from the length Len is substituted into the minimum length MinLen of the unit string to be searched. Then, after executing preprocessing PreProcess (Key, Len) in the preprocessing section 2 in step S2, a search process Search (Key, Dist, MinLen) is executed by the search section 5 in step S3. In the present preferred embodiment, each argument to be used in each subroutine is indicated in the parentheses () following the process name, and it is a variable valid in each subroutine as used in a language such as FORTRAN, BASIC or the like.

Figure 4:
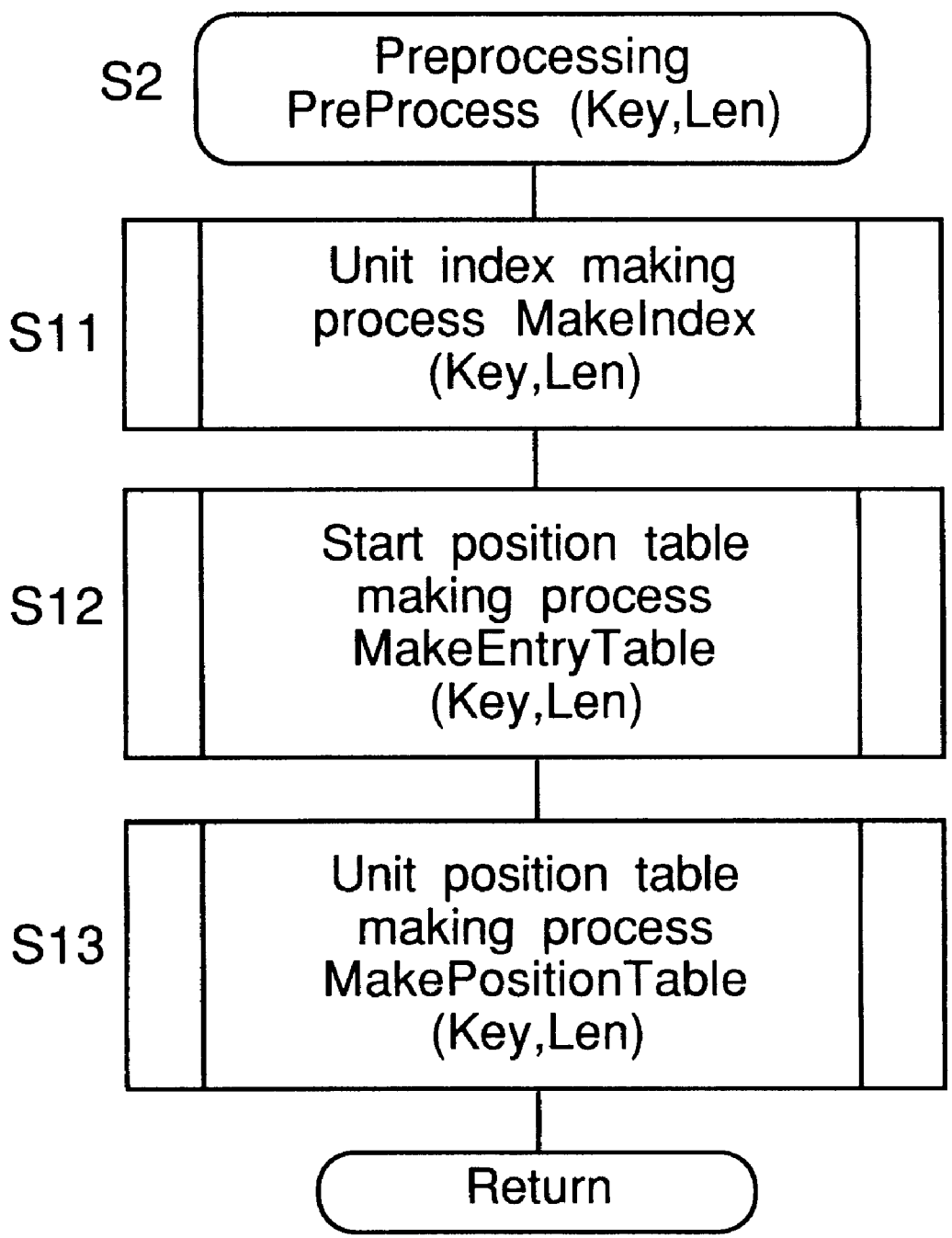
FIG. 4 is a flowchart showing a preprocessing (step S2) of a subroutine of FIG. 3.

FIG. 4 is a flowchart showing the preprocessing (step S2) of a subroutine of FIG. 3. The preprocessing is a processing for storing a relation of correspondence between each unit of the inputted search key and the position of the unit in the search key into the unit position correspondence memory 10.

Referring to FIG. 4, first of all, a unit index making process MakeIndex (Key, Len) for making a serial number table and a unit number table in step S11, then a start position table making process MakeEntryTable (Key, Len) for making a start position table is executed in step S12, and further a unit position table making process MakePositionTable (Key, Len) for making a unit position table is executed in step S13.

Figure 5:
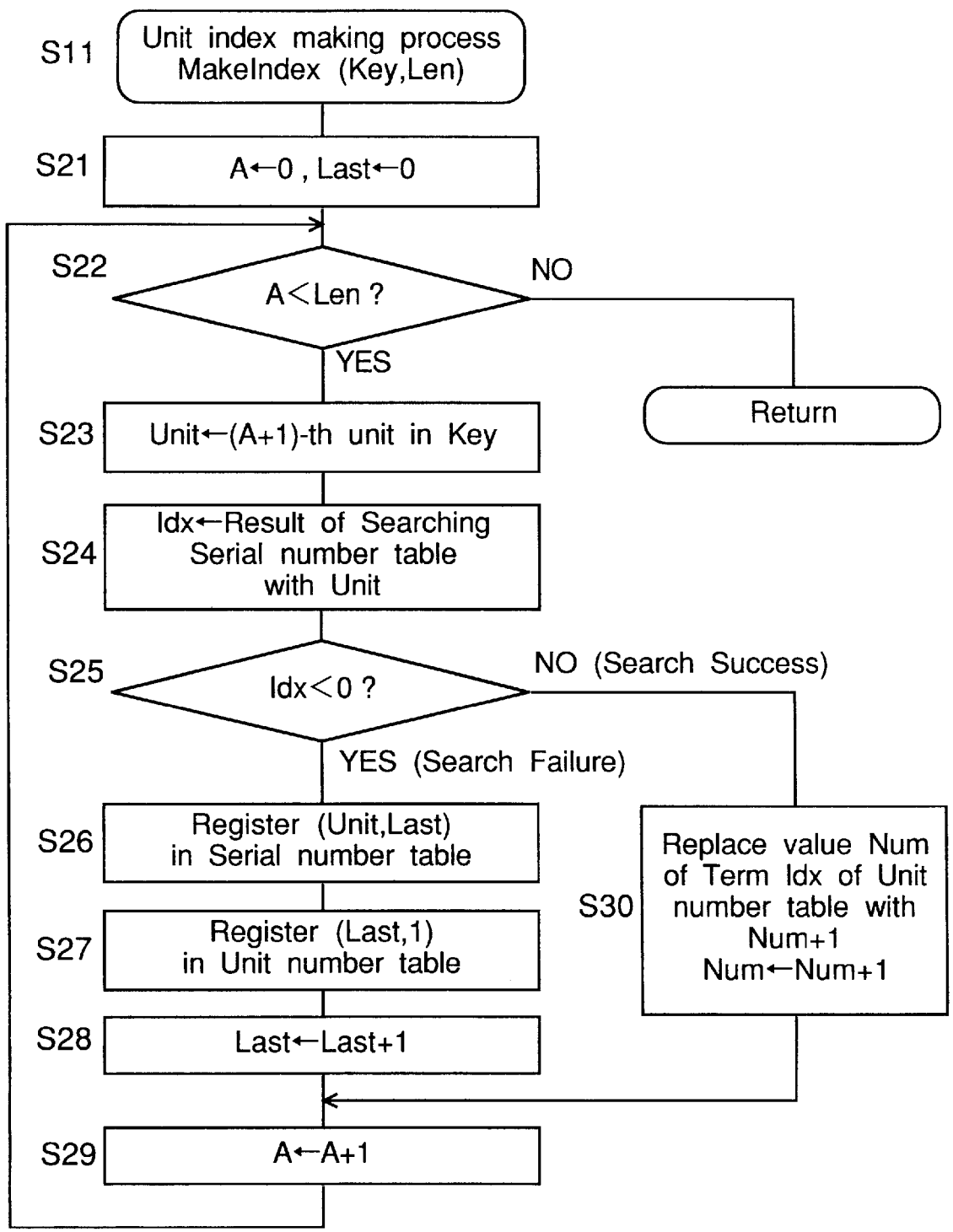
FIG. 5 is a flowchart showing a unit index making process (step S11) of a subroutine of FIG. 4.

FIG. 5 is a flowchart showing a unit index making process (step S11) of a subroutine of FIG. 4.

Referring to FIG. 5, first of all, the parameters of a number A and a last number Last of serial numbers are initialized to zero in step S21, and thereafter it is decided in step S22 whether or not A<Len. In this case, when A≧Len, it is decided that the process has completed, and the program flow returns to the original subroutine. When A<Len, the (A+1)-th unit in the search key Key is substituted into a unit Unit in step S23, and a search result obtained by searching the serial number table in the serial number table memory 11 with the unit Unit used as the search key, namely, a serial number corresponding to the unit Unit in the serial number table is substituted into an index parameter Idx in step S24. Then, it is decided in step S25 whether or not the index parameter Idx <0. In this case, when Idx≧0, meaning that the search is successful, a value Num of a unit number corresponding to the term of the serial number Idx of the search parameter in the unit number table inside the unit number table memory 12 is incremented by one to be updated in step S30, and thereafter the program flow proceeds to step S29. When Idx<0 in step S25, meaning that the search is unsuccessful, the unit does not exist. Therefore, a combination (Unit, Last) is registered at the serial number table in the serial number table memory 11 in step S26, and a combination (Last, 1) is registered at the unit number table in the unit number table memory 12 in step S27. Then, the last number Last of the serial numbers is incremented by one in step S28, the number A is incremented by one in step S29, and the program flow returns to step S22 to repeat the above-mentioned processing.

In this unit index making process, first of all, a number is given to each unit while making a unit index, so that a serial number table is made. For the index to be used in the serial number table, the known hash table, B-tree or the like can be utilized. When the types of unit are limited as in the case of alphabet, a code therefore may be used as a number instead of the serial number. For example, in the case of "a", a letter code "97" of the letter "a" can be used as the number without using the serial number table. Furthermore, in the unit index making process shown in FIG. 5, the unit number table expressing how often each unit appears in the search key is also made.

Figure 6:
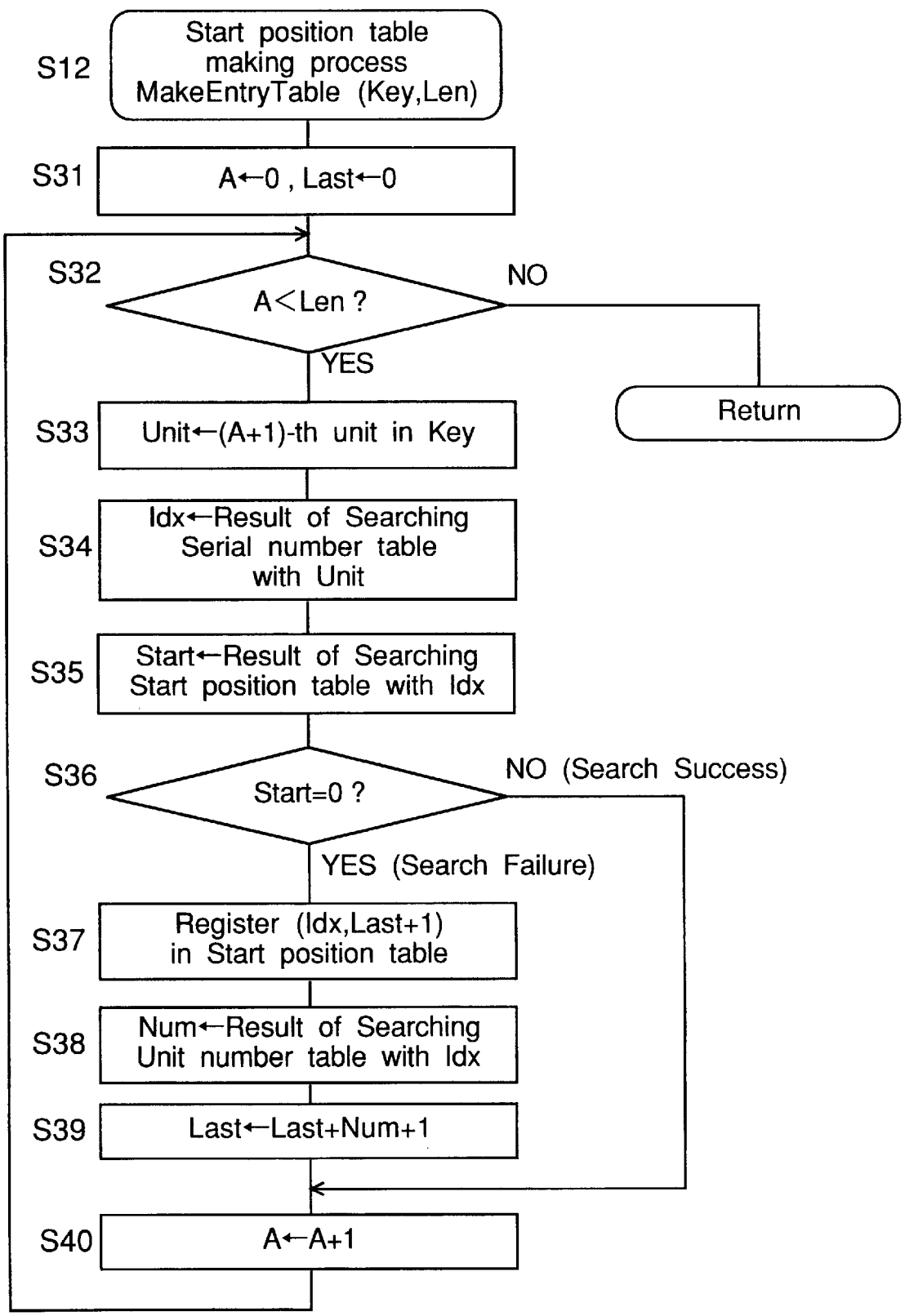
FIG. 6 is a flowchart showing a start position table making process (step S12) of a subroutine of FIG. 4.

FIG. 6 is a flowchart showing a start position table making process (step S12) of a subroutine of FIG. 4.

Referring to FIG. 6, first of all, the parameters of the number A and the last number Last of the start position are initialized to zero in step S31, and thereafter it is decided in step S32 whether or not A<Len. In this case, when A≧Len, it is decided that the process has completed, and the program flow returns to the original subroutine. When A<Len, the (A+1)-th unit in the search key Key is substituted into the unit Unit in step S33, and a search result obtained by searching the serial number table in the serial number table memory 11 with the unit Unit used as the search key, namely, a serial number corresponding to the unit Unit is substituted into the index parameter Idx in step S34. Then, a search result obtained by searching the start position table in the start position table memory 13 with the index parameter Idx used as the search key, namely, the start position corresponding to the serial number of the index parameter Idx is substituted into a start position Start in step S35. Then, it is decided in step S36 whether or not the start position Start=0. In this case, when the start position Start ≠0, meaning that the search is successful, the program flow proceeds to step S40. When the start position Start=0 in step S36, meaning that the search is unsuccessful, a combination (Idx, Last+1) is registered at the start position table in the start position table memory 13 in step S37, and a search result obtained by searching the unit number table in the unit number table memory 12 with the index parameter Idx used as the search key, namely, the unit number corresponding to the serial number of the index parameter Idx is substituted into the unit number Num in step S38. Then, the summation result of Last+Num+1 is updated as the last number Last of the start position in step S39, the serial number A is incremented by one to be updated in step S40, and thereafter the program flow returns to step S32 to repeat the above-mentioned processing.

In this start position table making process, the start position table that stores therein the start position which serves as an entry of the unit position table is made with the serial number given to each unit used as the search key. In this case, the unit position table is the table in which the positions of units in the search key are collectively by unit, and the start position table designates the position in which each unit on the unit position table starts.

Figure 7:
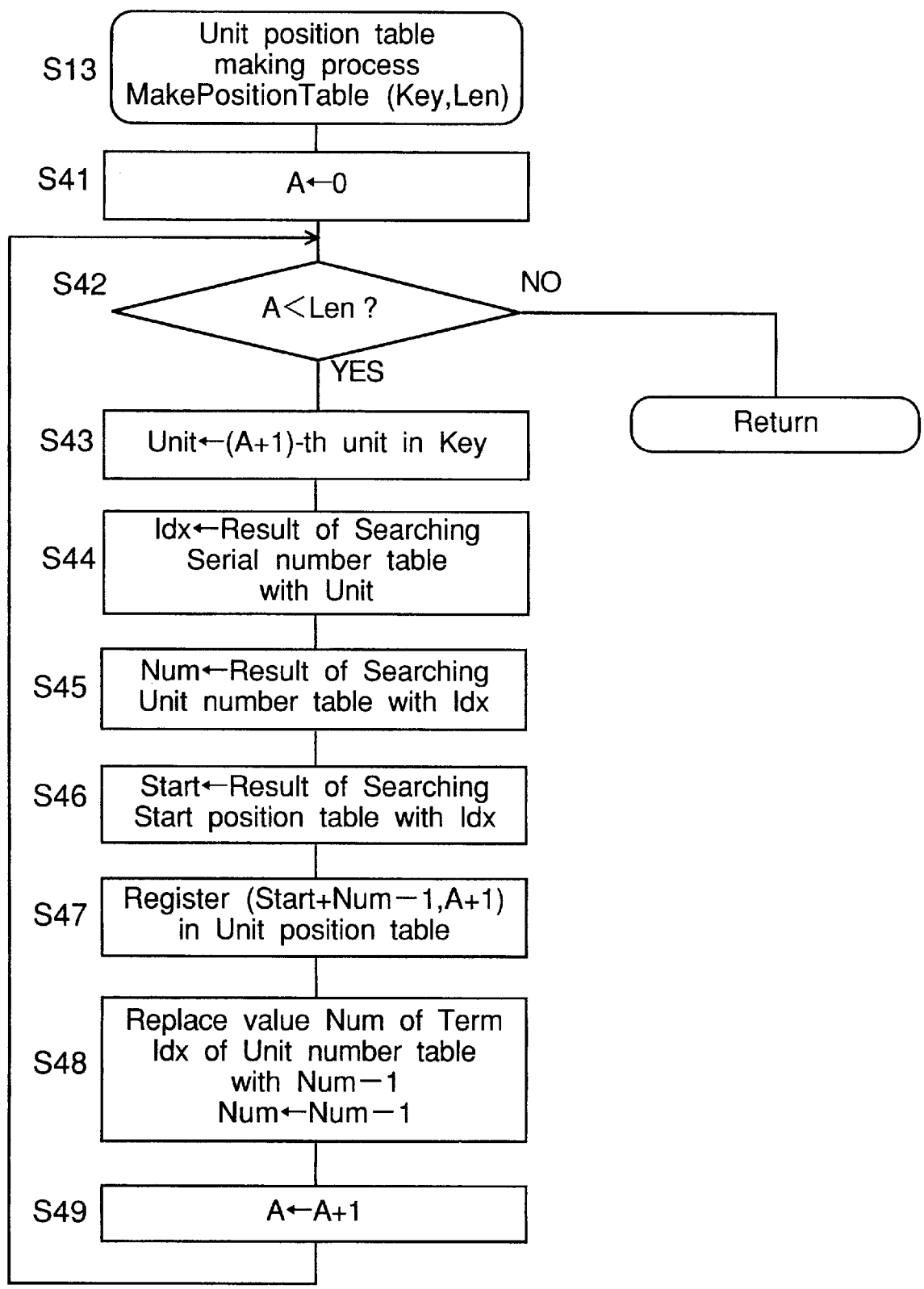
FIG. 7 is a flowchart showing a unit position table making process (step S13) of a subroutine of FIG. 4.

FIG. 7 is a flowchart showing a unit position table making process (step S13) of a subroutine of FIG. 4.

Referring to FIG. 7, first of all, the parameter of the number A is initialized to zero in step S41, and thereafter it is decided in step S42 whether or not A<Len. In this case, when A≧Len, it is decided that the process has completed, and the program flow returns to the original subroutine. When A<Len, the (A+1)-th unit in the search key is substituted into the unit Unit in step S43, and a search result obtained by searching the serial number table with the unit Unit used as the search key, namely, the serial number corresponding to the unit Unit is substituted into the index parameter Idx in step S44. Then, a search result obtained by searching the unit number table with the index parameter Idx used as the search key, namely, the unit number corresponding to the serial number Idx is substituted into the unit number Num in step S45. Further, a search result obtained by searching the start position table with the index parameter Idx used as the search key, namely, a start position corresponding to the index parameter Idx is substituted into the start position Start in step S46. Then, a combination (Start+Num−1, A+1) is registered at the unit position table in the unit position table memory 14 in step S47. Further, the unit number Num corresponding to the serial number Idx in the unit number table inside the unit number table memory 12 is replaced by Num−1 to be updated in step S48, the serial number A is incremented by one to be updated in step S49, and thereafter the program flow returns to step S42 to repeat the above-mentioned processing.

In this unit position table making process, the unit position table is the table in which the positions of units in the search key are collectively grouped every unit, while the start position table designates the position in which each unit on the unit position table starts and stores therein the positions of the units in the search key on the unit position table in the last stage of the processing.

Figure 8:
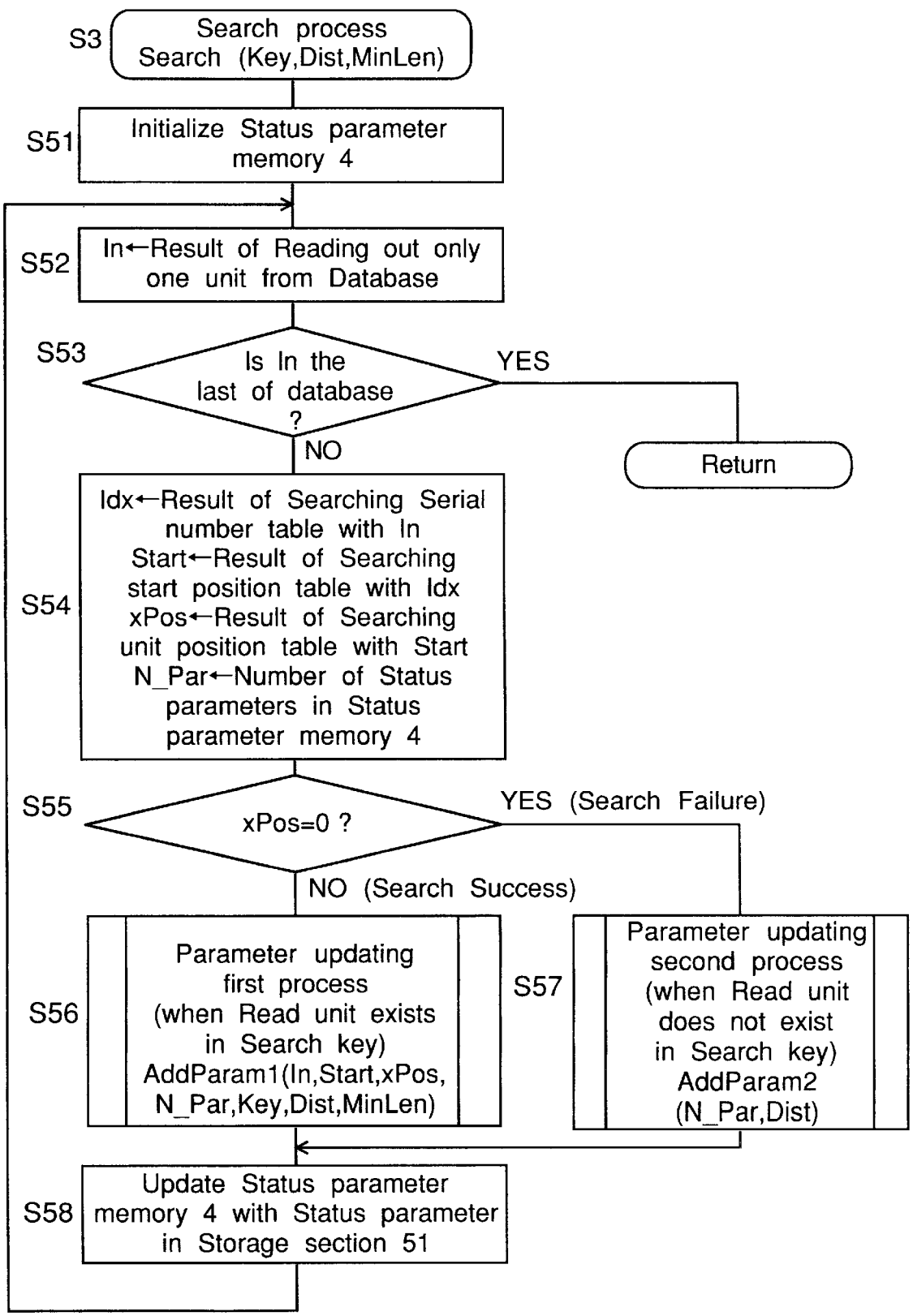
FIG. 8 is a flowchart showing a search process (step S3) of a subroutine of FIG. 3.

FIG. 8 is a flowchart showing a search process (step S3) of a subroutine of FIG. 3.

Referring to FIG. 8, each status parameter in the status parameter memory 4 is initialized to zero in step S51. In this case, the status parameter has a structure that expresses with what number of units from the top of the search key the units read out from the database have coincided at what degree of similarity and expresses how many units in the database have been skipped over subsequently. This can be expressed by the combinations of three numbers of (position, similarity, skip number). Then, a unit obtained by reading out only one unit from the database in the database memory 3 is substituted into a unit In in step S52, and it is decided in step S53 whether or not the unit In is the last unit of the database in the database memory 3. When it is the last unit, it is decided that the search process has been completed, and the program flow returns to the original subroutine. When it is not the last unit in step S53, a search result obtained by searching the serial number table with the unit In used as the search key, namely, the serial number corresponding to the unit A is substituted into the index parameter Idx, a search result obtained by searching the start position table with the index parameter Idx used as the search key, namely, the start position corresponding to the index parameter Idx is substituted into the start position Start, a a search result obtained by searching the unit position table with the start position Start used as the search key, namely, the unit position corresponding to the start position Start is substituted into a unit position xPos, and further the number of the status parameter combinations in the status parameter memory 4 is substituted into N_Par in step S54. Then it is decided in step S55 whether or not the unit position xPos=0. In this case, when the unit position xPos≠0, meaning that the search is successful, after executing a parameter updating first process AddParam1 (In, Start, xPos, N_Par, Key, Dist, MinLen) when the read unit exists in the search key in step S56 and thereafter updating the status parameter memory 4 with the status parameter stored in the storage section 51 in step S58, the program flow returns to step S52 to repeat the above-mentioned processing. When xPos=0 in step S55, meaning that the search is unsuccessful, after executing a parameter updating second process AddParam2 (N_Par, Dist) when the unit read out in step S57 does not exist in the search key, the program flow proceeds to step S58.

Figure 9:
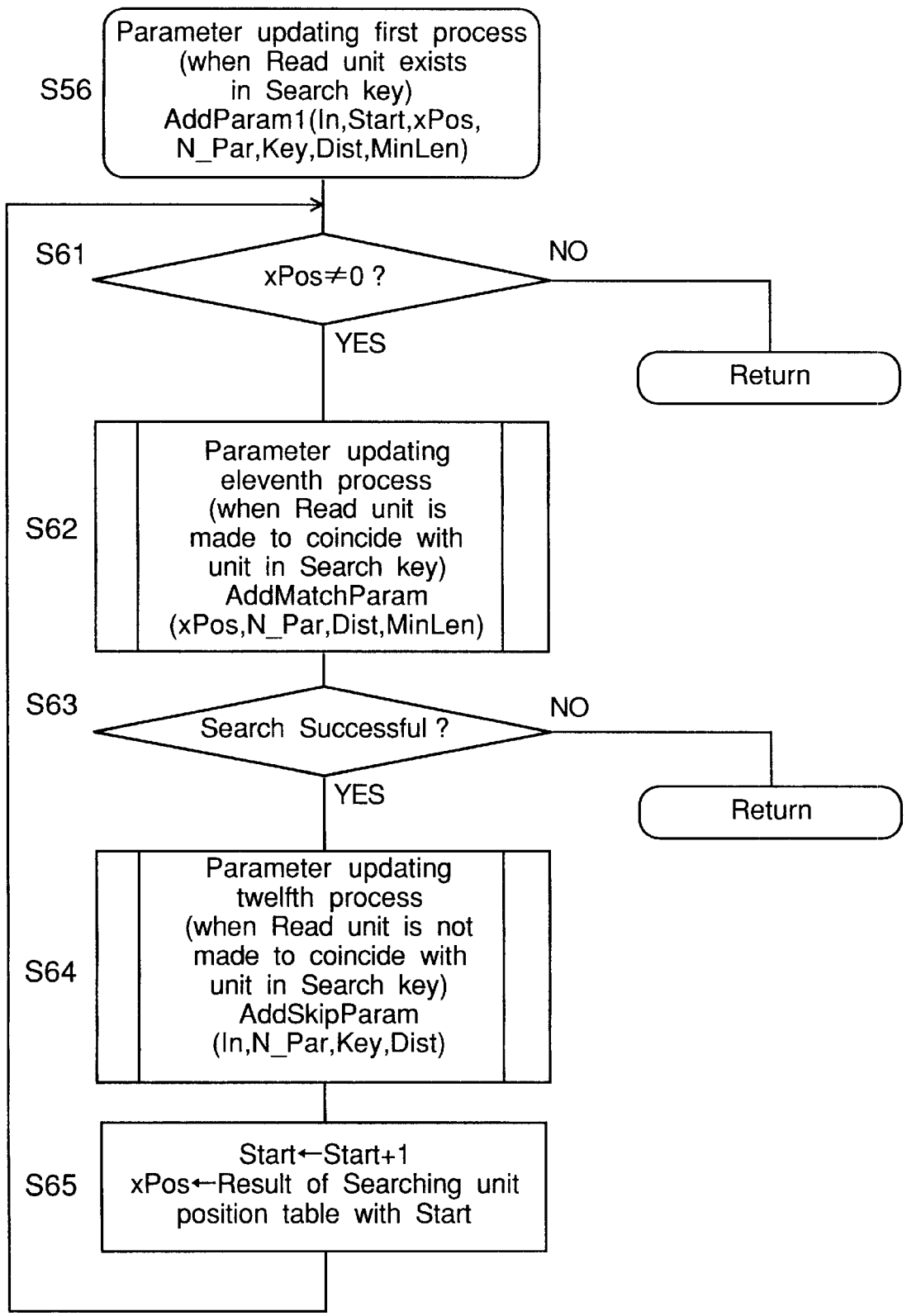
FIG. 9 is a flowchart showing a parameter updating first process (step S56) of a subroutine of FIG. 8.

FIG. 9 is a flowchart showing the parameter updating first process AddParam1 (In, Start, xPos, N_Par, Key, Dist, MinLen) (step S56) of a subroutine of FIG. 8.

Referring to FIG. 9, first of all, it is decided in step S61 whether or not the unit position xPos≠0. When the unit position xPos=0, it is decided that the processing has been completed, and the program flow returns to the original subroutine. When the unit position xPos≠0 in step S61, after executing a parameter updating eleventh process AddMatchParam (xPos, N_Par, Dist, MinLen) for the case where the read unit and the unit in the search key are made to coincide with each other, it is decided in step S63 whether or not the search process has been succeeded. When the search is successful, it is decided that the process has been completed, and the program flow returns to the original subroutine. When the search is unsuccessful in step S63, after executing a parameter updating twelfth process AddSkipParam (In, N_Par, Key, Dist) for the case where the read unit and the unit in the search key are not made to coincide with each other in step S64, the serial number Start of the start position is incremented by one to be updated. Then, a search result obtained by searching the unit position table with the start position Start used as the search key, i.e., the start position corresponding to the serial number Start of the start position is substituted into the unit position xPos, and the program flow proceeds to step S61 to repeat the above-mentioned processing.

Figure 10:
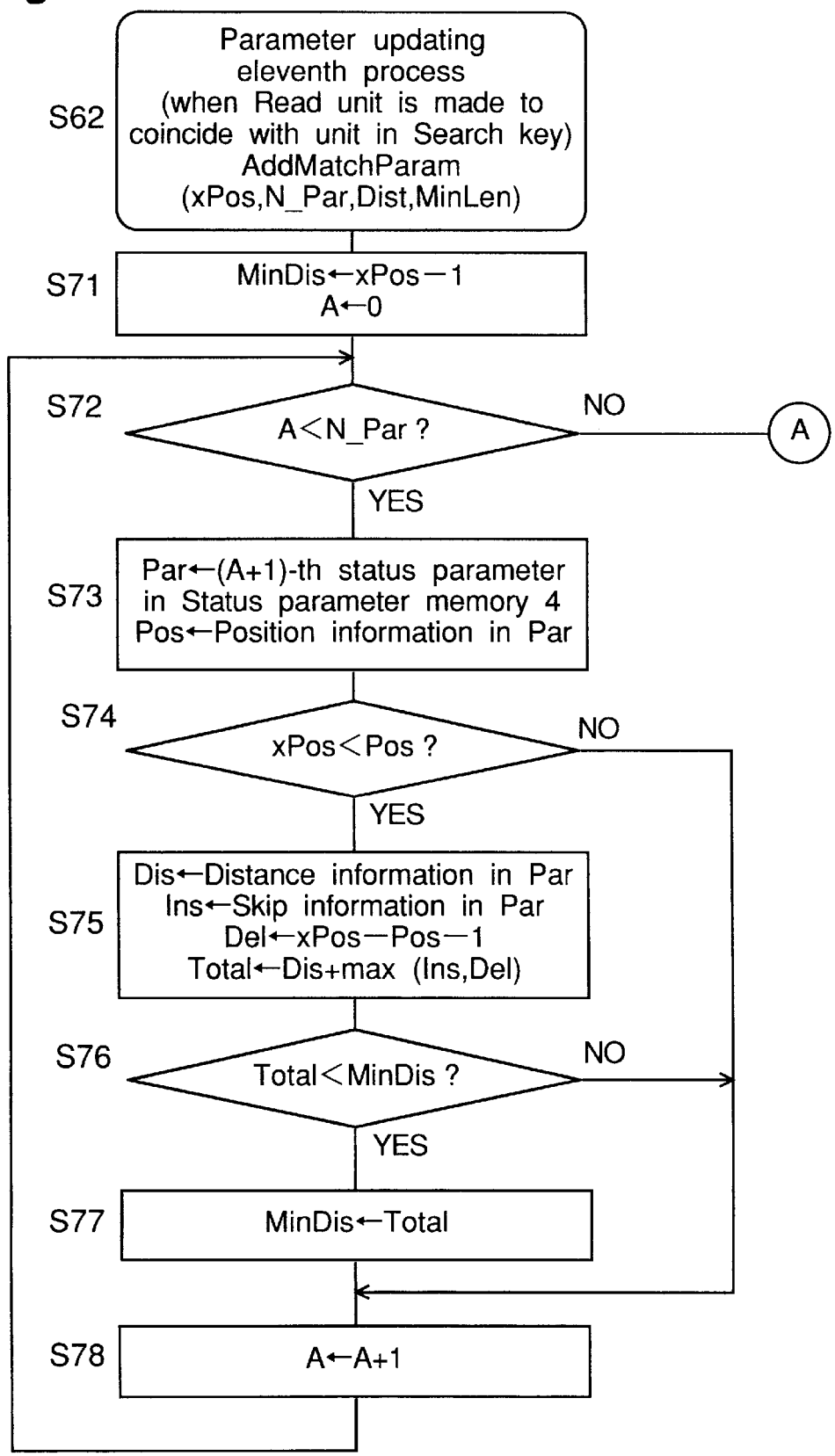
FIG. 10 is a flowchart showing a first part of a parameter updating eleventh process (step S62) of a subroutine of FIG. 9.
Figure 11:
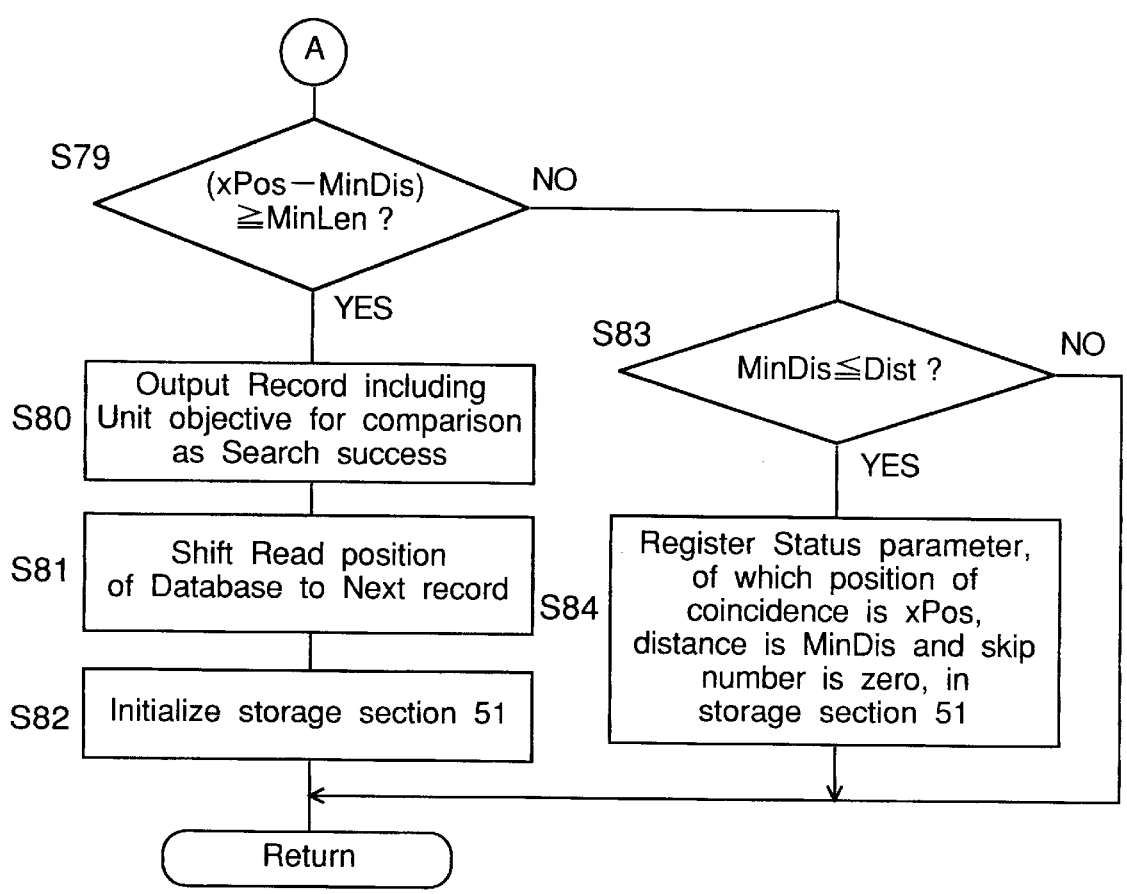
FIG. 11 is a flowchart showing a second part of the parameter updating eleventh process (step S62) of the subroutine of FIG. 9.

FIGS. 10 and 11 are flowcharts showing the parameter updating eleventh process AddMatchParam (xPos, N_Par, Dist, MinLen) (step S62) of a subroutine of FIG. 9. In step S71 of FIG. 10, first of all, a result obtained by subtracting one from the unit position xPos is substituted into a minimum distance MinDis, and the status number parameter A is initialized to zero. Then, it is decided in step S72 whether or not the status number parameter A<N_Par. In this case, when the status number parameter A≧N_Par, the program flow proceeds to step S79. When the status number parameter A<N_Par in step S72, the (A+1)-th status parameter inside the status parameter memory 4 is substituted into a status parameter Par and position information in the status parameter Par is substituted into position information Pos in step S73, and thereafter it is decided in step S74 whether or not the unit position xPos<Pos. In this case, when unit position xPos≧Pos, the program flow proceeds directly to step S78. When the unit position xPos<Pos in step S74, distance information in the status parameter Par is substituted into a distance Dis, skip information in the status parameter Par is substituted into a skip number Ins, (xpos−Pos−1) is substituted into a deletion number Del, and (Dis+max(Ins, Del)) is substituted into a total number Total in step S75. In this case, max(Ins, Del) is the value of the maximum value of the skip number Ins and the deletion number Del. Then, it is decided in step S76 whether or not the total number Total<MinDis. In this case, when the total number Total≧MinDis, the program flow proceeds to step S78. When the total number Total<MinDis in step S76, the total number Total is substituted into the minimum distance MinDis in step S77. Then the program flow proceeds to step S78 to increment the status number parameter A by one to update it, and thereafter the program flow proceeds to step S72.

In step S79 of FIG. 11, it is decided whether or not (xPos−MinDis)≧MinLen. In this case, when (xPos−MinDis) ≧MinLen, it is decided in step S80 that the search is successful, and a predetermined unit string (record) including the unit objective for comparison is outputted. For example, when the similarity is defined by the distance of edition in units of letters, a word including the objective letter string for comparison is outputted. Then, the read position of the database in the database memory 3 is shifted to the top of the next record in step S81, the status parameters stored in the storage section 51 are all initialized in step S82, and the program flow returns to the original subroutine. When (xPos−MinDis)<MinLen in step S79, it is decided in step S80 that the search is unsuccessful, and it is decided in step S83 whether or not the minimum distance MinDis≦Dist. In this case, when the minimum distance MinDis≦Dist, a status parameter of which position of coincidence is xPos, distance is MinDis and skip number is zero is registered at the storage section 51 in step S84, and thereafter the program flow returns to the original subroutine.

Figure 12:
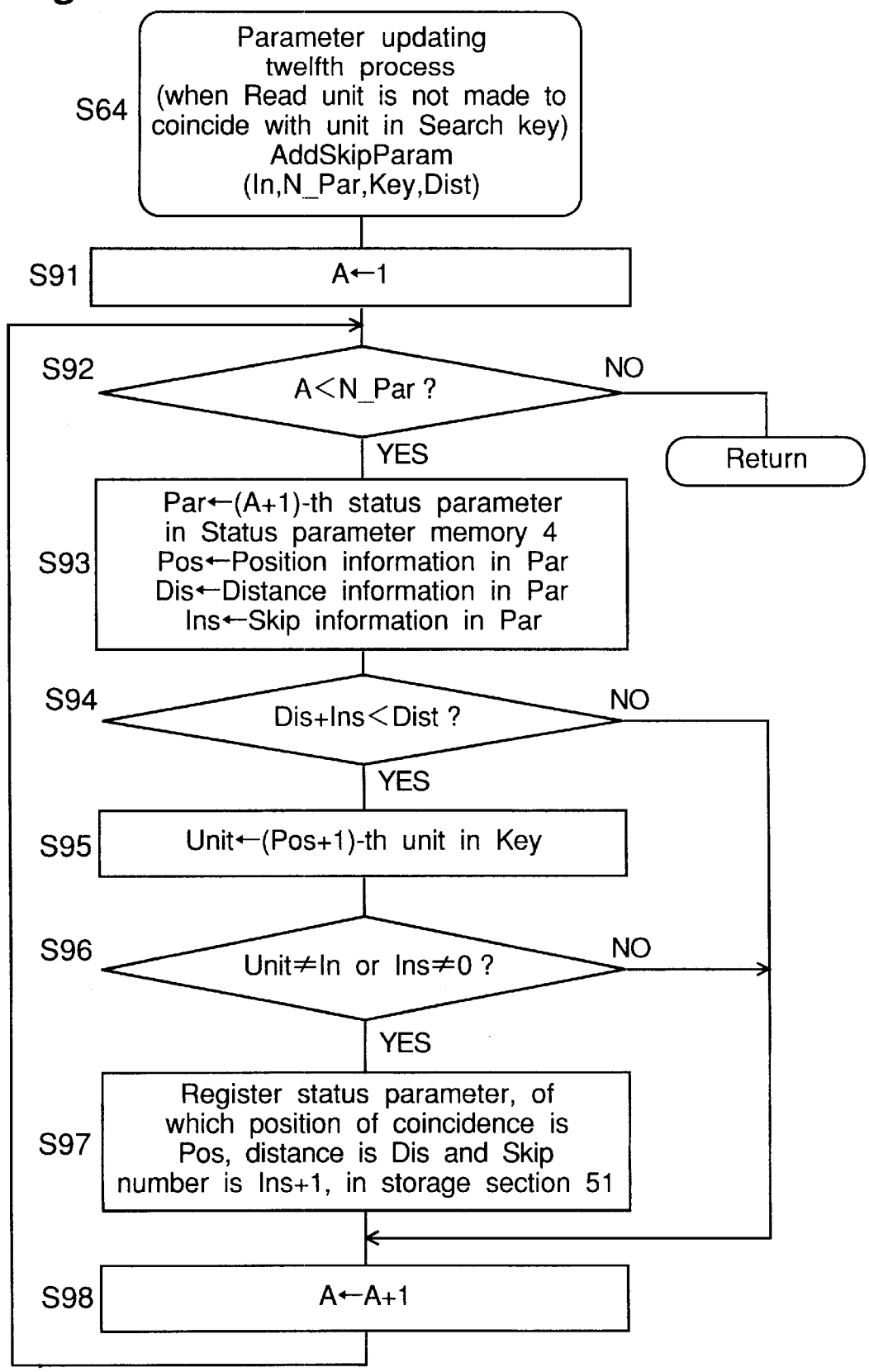
FIG. 12 is a flowchart showing a parameter updating twelfth process (step S64) of a subroutine of FIG. 9.

FIG. 12 is a flowchart showing the parameter updating twelfth process AddSkipParam (In, N_Par, Key, Dist) (step S64) of a subroutine of FIG. 9.

Referring to FIG. 12, first of all, the status number parameter A is initialized to zero in step S91, and it is decided in step S92 whether or not the status number parameter A<N_Par. In this case, when the status number parameter A≧N_Par, it is decided that the processing has been completed, and the program flow returns to the original subroutine. When the status number parameter A<N_Par, the (A+1)-th status parameter inside the status parameter memory 4 is substituted into the status parameter Par, the position information in the status parameter Par is substituted into the position information Pos, the distance information in the status parameter Par is substituted into the distance information Dis, the skip information in the status parameter Par is substituted into is the skip information Ins in step S93, and thereafter it is decided in step S94 whether or not (Dis+Ins)<Dist. In this case, when (Dis+Ins)≧Dist, the program flow proceeds to step S98. When (Dis+Ins) <Dist, the (Pos+1)-th unit in the search key Key is substituted into the unit Unit in step S95, and it is decided in step S96 whether or not the unit Unit 16 In or the skip information Ins≠0. In this case, when the decision condition is NO or negative, the program flow proceeds directly to step S98. When the decision condition in step S97 is YES or affirmative, a status parameter of which position of coincidence is Pos, distance is Dis and skip number is (Ins+1) is stored in the storage section 51, and thereafter the program flow proceeds to step S98. After the status number parameter A is incremented by one to be updated in step S98, the program flow returns to step S92 to execute the above-mentioned processing.

Figure 13:
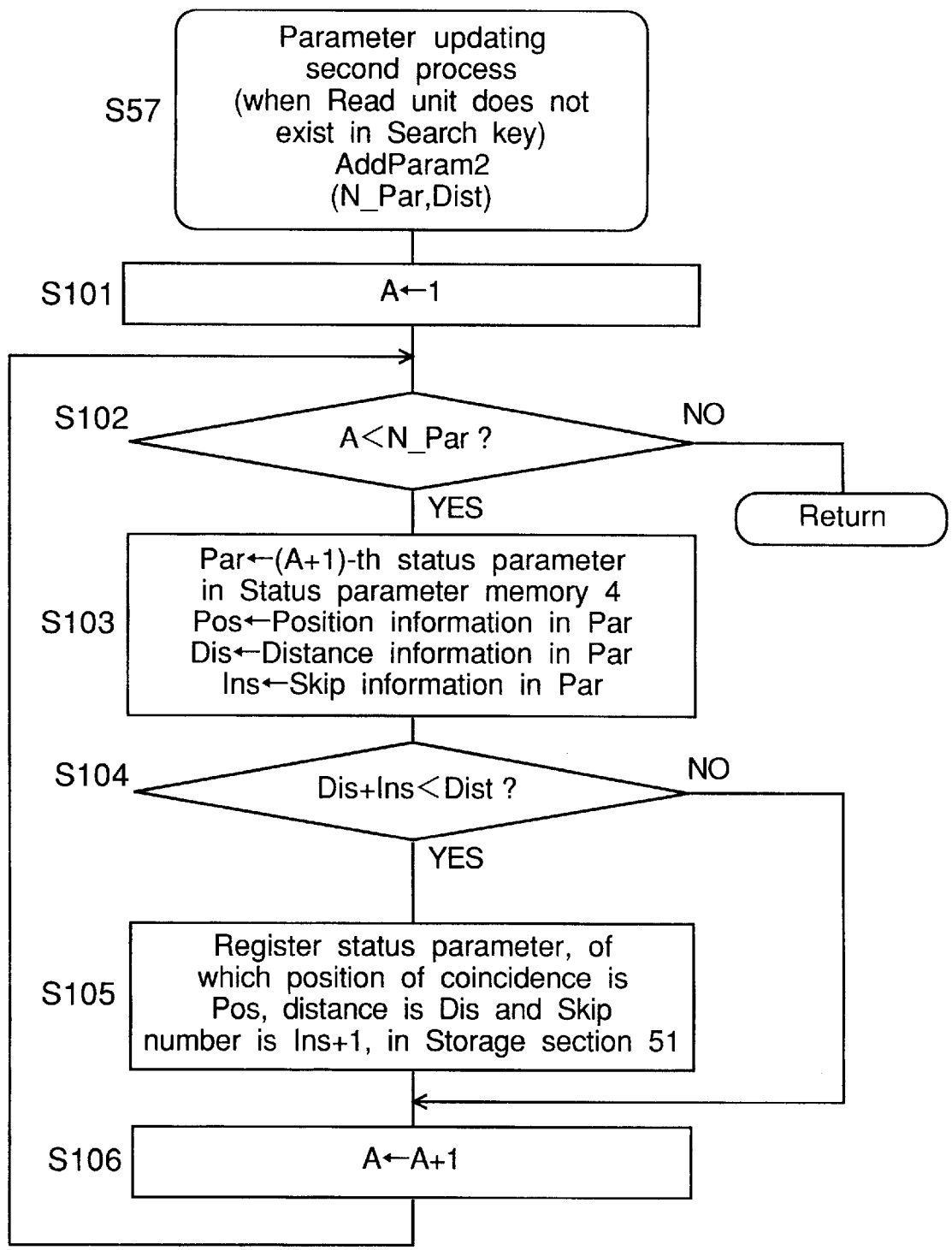
FIG. 13 is a flowchart showing a parameter updating second process (step S57) of a subroutine of FIG. 8.

FIG. 13 is a flowchart showing the parameter updating second process AddParam2 (N_Par, Dist) (step S57) of a subroutine of FIG. 8.

Referring to FIG. 13, the status number parameter A is initialized to one in step S101, and it is decided in step S102 whether or not the status number parameter A<N_Par. In this case, when the status number parameter A≧N_Par, it is decided that the processing has been completed, and the program flow returns to the original subroutine. When the status number parameter A<N_Par, the (A+1)-th status parameter inside the status parameter memory 4 is substituted into the status parameter Par, the position information in the status parameter Par is substituted into the position information Pos, the distance information in the status parameter Par is substituted into the distance information Dis, the skip information in the status parameter Par is substituted into the skip information Ins in step S103, and thereafter it is decided in step S104 whether or not (Dis+Ins)<Dist. In this case, when (Dis+Ins)≧Dist, the program flow proceeds to step S106. When (Dis+Ins)<Dist, a status parameter of which position of coincidence is Pos, distance is Dis and skip number is (Ins+1) is stored in the storage section 51, and thereafter the program flow proceeds to step S106. After the status number parameter A is incremented by one to be updated in step S106, the program flow returns to step S102 to execute the above-mentioned processing.

The operation of the similarity search apparatus shown in FIG. 1 will be described below, the operation being, in particular, in the case where the unit of edition is a letter and "abcad" is inputted as a search key.

In the preprocessing executed by the preprocessing section 2, first of all, the unit index making process is executed to make a unit index. In this case, a serial number table that provides the letters of "a", "b", "c" and "d" by indexing them (See FIG. 2A) and a unit number table that expresses how many corresponding letters appear in the search key according to the number given to each letter is made (See FIG. 2B). Then, a start position table making process is executed to make a start position table that designates the entry position of the unit position table according to the number given to each letter (See FIG. 2C). In this case, so as to allow the unit position to be controlled by letter in the unit position table, start positions are set and stored at intervals of the number of appearance of each letter in the search key plus one (delimiter). Further, the unit position table making process is executed to make a unit position table that expresses the ordinal number among units at which each unit has appeared within the search key (See FIG. 2D). On the unit position table, the unit positions are grouped by letter so as to be controlled in descending order.

These tables are stored in the unit position correspondence memory 10. By using these tables as exemplified in FIGS. 2A to 2D, the position of the unit of the letter "a" in the search key "abcad" can be obtained as follows. First of all, the unit index is searched by the unit "a" to obtain a serial number "0" corresponding to the unit "a". Then, with reference to the start position table by means of the previously obtained serial number "0", it can be found that the start position of the entry of the unit position table is "1". Accordingly, with reference to the value of the unit position corresponding to the serial number "1" on the unit position table, the unit position "4" can be obtained, and it can be found that the fourth unit in the search key is "a". Further, with reference to the serial number "2" of the entry (start position) next to the serial number "1" on the unit position table, the unit position "1" can be obtained, and it can be found that the first unit in the search key is also "a". Further, with reference to the serial number "3" of the next entry (start position), the value to be obtained is the letter position "0", and it can be found that the unit "a" is not appearing in any other position in the search key.

The search process shown in FIG. 8 is the search process for proceeding the search process by updating the status parameter expressing the midway status of search every time one unit is read out from the database. In this case, the status parameter has a structure that expresses with what number of units from the top of the search key the units read out from the database have coincided at what degree of similarity and expresses how many units in the database have been skipped over subsequently. This can be expressed by the combinations of three numbers of (position, similarity, skip number). If the status parameter becomes (Pos, Dis, Ins) with respect to the search key of the unit number Len, the similarity in the status expressed by the status parameter becomes not greater than $$Dis+(Len-Pos) \tag{1}$$

This means that the similarity from the first unit to the Pos-th unit of the search key is Dis, and the similarity from the remaining (Pos+1)-th unit to the Len-th unit becomes the unit number (length) of the remaining portion at maximum, and therefore, the total similarity becomes not greater than the sum of them.

In the similarity search apparatus of the present preferred embodiment, the search result is decided by comparing Dis+(Len−Pos) of the above equation (1) with a predetermined threshold value Dist. In particular, the value of Dis+(Len−Pos) of the above equation (1) varies only when the unit in the search key Key and the unit in the database coincide with each other, and therefore, it is proper to execute decision of the search result only when a status parameter expressing this status can be generated. Furthermore, the two elements of the above equation (1) can be found in the stage in which the search key Key and the threshold value Dist are inputted, and therefore, by first of all, calculating the part of $$Len-Dist\ (=MinLen) \tag{2}$$

and then using $$Pos-Dis \geq MinLen \tag{3}$$

for the decision of the search result, the frequency of calculation can be reduced. In the similarity search apparatus of the preferred embodiment described in this specification, the minimum length MinLen is calculated in the stage in which the search key Key and the threshold value Dist are inputted (step S1 of FIG. 3). First of all, in this case, zero is stored when the inputted threshold value Dist is smaller than zero, Len is stored when the threshold value Dist is greater than the length Len, or the inputted threshold value Dist itself is case, respany other case, respectively as the threshold value Dist to be used for similarity search. This is because the region of definition of the distance of edition with respect to the search key Key extends from zero to the length Len of the search key. Further, (Len−Dist) to be used for the decision of the search result is calculated by means of the threshold value Dist obtained in this case, and it is stored as the minimum length MinLen. Then, in step S79 of FIG. 11, it is decided whether or not the search is successful by means of {Pos−Dis≧MinLen} of the above-mentioned equation (1). It is to be noted here that the newly calculated status parameter is (xPos, MinDis, 0), and therefore, $$xPos-MinDis \geq MinLen \tag{4}$$

is used as a practical decision equation. Therefore, since the result can be found before executing the similarity calculation for the entire search key Key according to this method, a high-speed search can be achieved.

For example, it is assumed that the unit of edition is a letter, the search key is "abcad" and "d" and "b" are successively read out from the database. In this case, the unit "b" that has been read out lastly coincides with "b", or the second unit in the search key, and the similarity between the antecedent partial unit string "ab" of the search key and the unit string "db" read out from the database is one. That is, the status parameter expressing this status is (2, 1, 0). In this case, the length of the unit string in the search key subsequent to the coincident unit "b" has a value obtained by subtracting the coincidence position of two in the status parameter from the length of five of the search key, the value being consequently three. Therefore, it can be detected that a unit string whose distance (similarity=1/distance) with respect to the search key becomes not greater than four has appeared in the database. Further assuming that units "c" and "a" are read out from the database, a status parameter (4, 1, 0) is generated as a result of updating. When the threshold value is two in this case, there is satisfied the equation:

$$1+(5-4) \geq 2 \tag{5}$$

and therefore a unit string that coincides with the search key at a distance of not greater than two can be detected.

The status parameter updating process includes mainly the following two steps. (I) Parameter updating first process (step S56): When the unit read out from the database exists in the search key, the status parameter is updated so that the position information coincides with the current position of coincidence. The similarity information of this new status parameter is the sum of max (current position of coincidence)−(position in the status parameter in the previous status), (skip number in the status parameter in the previous status) and (similarity in the status parameter in the previous status), and the skip number is zero (See step S84 of FIG. 11). In this case, the previous status means the status previous to the status that is currently processed.

Further, the step number of every status parameter in the previous status is increased by one (See step S97 of FIG. 12).

(II) Parameter updating second process (step S57): When the unit read out from the database does not exist in the search key, the step number of every status parameter in the previous status is increased by one (See step S105 of FIG. 13).

In the present case, the parameter updating first process is the updating process executed by generating a status in which the unit read out from the database coincides with the unit in the search key, while the parameter updating second process is the updating process executed by generating a status in which the unit read out from the database is skipped over.

By executing the above updating processes every time the units are read out one by one from the database, a plurality of status parameters are generated. The similarity used in the similarity search apparatus of the present preferred embodiment is based on the minimum number of editing operations (distance of edition) for making two unit strings coincide with each other. There is a plurality of possibilities in regard to such an editing operation string, and it is required to consider all the combinations of the two unit strings in order to know the minimum number. The reason why the plurality of status parameters are generated is to cope with the plurality of possibilities of the editing operation string. It is to be noted that the searching speed reduces in proportion to the number of status parameters because the updating process requires checking of each status parameter.

The similarity search apparatus of the present preferred embodiment allows the searching speed to be increased by suppressing the generation of status parameters under predetermined conditions and reducing them in number. The above-mentioned conditions are, for example, as follows.

(I) Condition 1: The sum of the similarity and the skip number in each status parameter does not exceed the predetermined threshold value.

(II) Condition 2: The status parameter to be updated in the parameter updating second process is only the status parameter whose similarity is minimized among the status parameters generated through this process.

(III) Condition 3: In the case where the unit read out from the database appears within the search key, the parameter updating in the parameter updating twelfth process is not executed when the units next to the unit in the search key and the unit in the database that have coincided with each other in the previous status coincide with each other.

The above-mentioned condition 1 will be described. In the case where the unit number (length) of the search key is Len and the status parameter is (Pos, Dis, Ins), when the skip number Ins is smaller than (Len−Pos), the similarity in the status is greater than Dis+Ins. When the skip number Ins is greater than (Len−Pos), the similarity in the status is Dis+(Len−Pos). The similarity monotonously increases accordingly as the status parameter is updated. Therefore, when (Dis+Ins) exceeds the threshold value, it never has a similarity of not greater than the threshold value even when the status is updated. Therefore, by suppressing the generation of status parameters as described above, the number of status parameters can be reduced without varying the search result. This corresponds to the branching condition of "MinDis≧Dist" in step S83 of FIG. 11 or the branching condition of "Dis+Ins<Dist" in step S94 of FIG. 12 and step S104 of FIG. 13.

The above-mentioned condition 2 will be described next. According to the definition of the updating process, even when the status parameters of identical position information are updated, a difference between the similarities expressed by the status parameters is saved. The minimum value of similarity (the minimum number of editing operations) is required to be obtained, and therefore, when the position information is identical, the similarity can be calculated by leaving only the status parameter whose similarity is minimized. By this operation, the number of status parameters can be reduced without varying the search result. This corresponds to a loop portion at the beginning of step S72 of FIG. 10. In this case, the possibility of the first coincidence of a unit in the search key (the possibility that all the units in the search key existing prior to the coincident unit will be deleted) and the possibility of continuous coincidence from the previous status expressed by the status parameter are inspected, and the one whose similarity is minimized is selected.

The above-mentioned condition 3 will be described next. According to the definition of the updating process, by executing the parameter updating process in the parameter updating twelfth process even when the unit read out from the database appears in the search key, a status in which the unit in the database and the unit in the search key do not coincide with each other is generated. This is because the similarity does not always reduce according to the increase in number of the coincident units and the similarity sometimes reduces further when the unit in the database is skipped over.

Figure 14A:
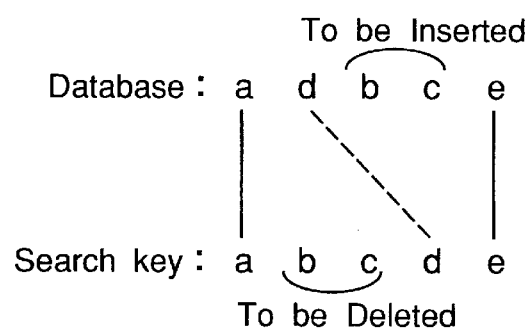
Figure 14B:
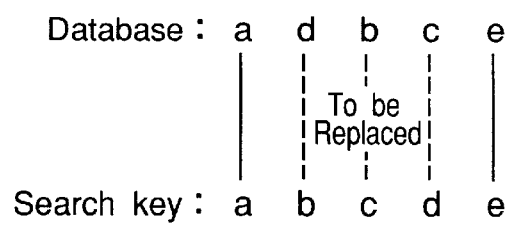

FIGS. 14A and 14B are diagrams showing examples in which, even if a unit in the search key appears in the database in the process of the central processing unit 1 of the similarity search apparatus shown in FIG. 1, a lower similarity results when they are not made to coincide with each other, wherein FIG. 14A shows a process in the case where a unit "d" read out from the database in the database memory 3 is made to coincide with a unit "d" in the search key, and FIG. 14B shows a process in the case where the unit "d" read out from the database memory 3 is not made to coincide with the unit "d" in the search key.

We consider the case where a unit string "adfge" exists in the database with respect to a search key "abcde". In this case, when the unit "d" in the search key and the unit "d" in the database coincide with each other, the editing operation string for making both the unit strings coincide with each other is to delete the units "b" and "c"l in the search key and insert units "f " and "g" in between the units "d" and "e", when the distance is four (See FIG. 14A). However, by replacing the units "b", "c" and "d" in the search key with the units "d", "e" and "f"without making both the units "d" coincide with each other, both the unit strings can be made identical, and therefore, the correct similarity is three (See FIG. 14B). Therefore, in the stage in which the units up to the unit "d" have been read out from the database, it is required to concurrently leave the possibility that the unit "d" will coincide with the fourth unit "d" in the search key and the possibility that they will not coincide with each other. However, in the case of the units next to the units that have coincided with each other in the previous status, there is no other unit between the portions that have coincided with each other in the previous status and the portions that are coincided with each other in the current status, and therefore, no such phenomenon as described above occurs. Therefore, in the case of the units next to the units that have coincided with each other in the previous status, the number of status parameters can be reduced without varying the search result if the parameter updating twelfth process is not executed. This corresponds to the condition branching portion of "(Unit≠In) or (Ins≠0)" in step S96 of FIG. 12.

Figure 15:
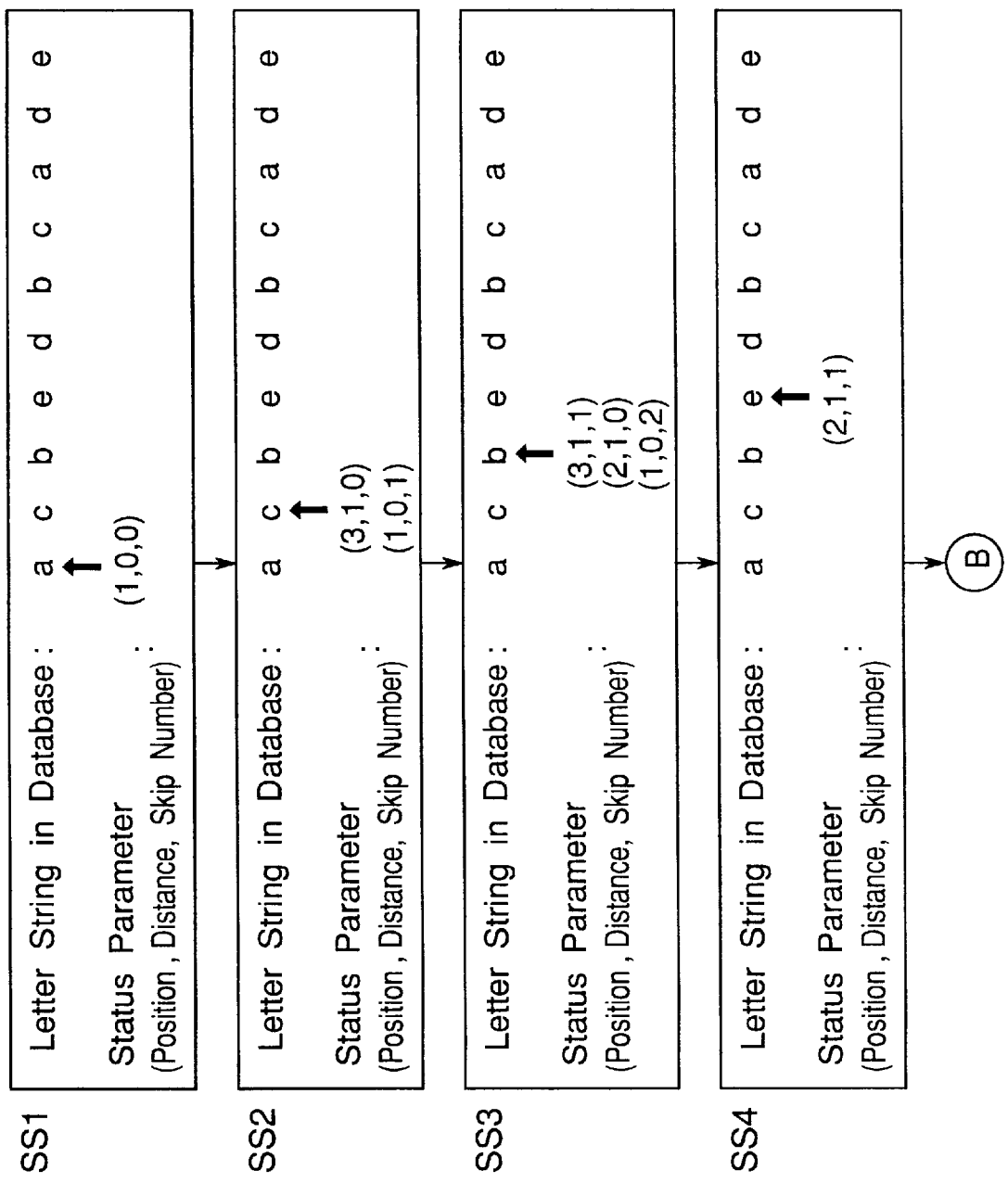
FIG. 15 is a diagram showing the process of the central processing unit 1 of the similarity search apparatus shown in FIG. 1, presenting a first part of a status parameter transition in the case where the search key is "abcad" and the threshold value is two.
Figure 16:
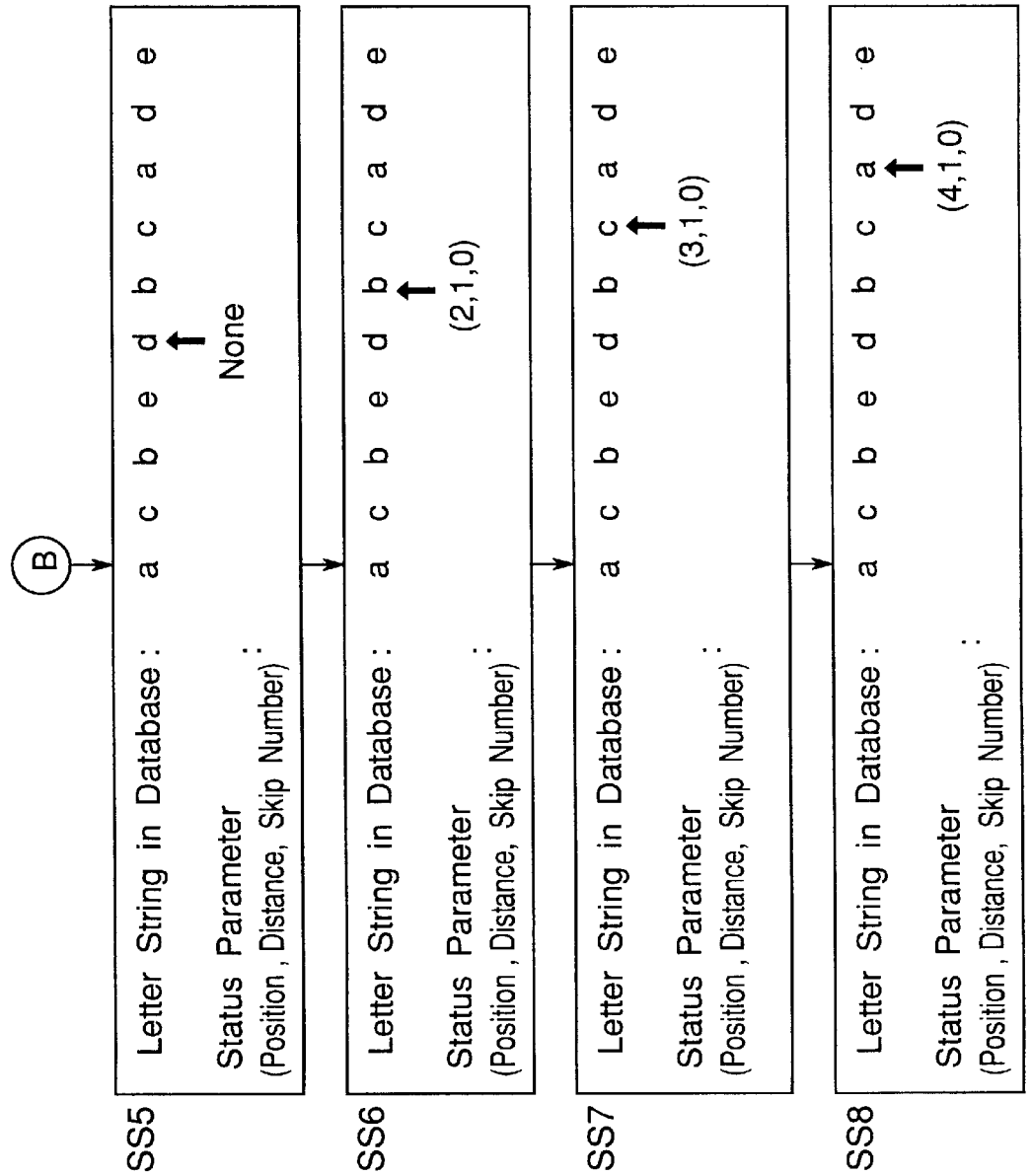
FIG. 16 is a diagram showing the process of the central processing unit 1 of the similarity search apparatus shown in FIG. 1, presenting a second part of a status parameter transition in the case where the search key is "abcad" and the threshold value is two.

FIGS. 15 and 16 show the transition (from step SS1 to step SS8) of the status parameter occurring according as "acbedbcade" is read out from the database when the search key is "abcad" and the threshold value is two.

First of all, when the unit "a" is read out at the beginning from the database inside the database memory 3 in step SS1, the possibility that this will coincide with the first unit "a" of the search key is calculated and stored as a status parameter (1, 0, 0). Then, the possibility of the coincidence with the fourth unit "a" of the search key is calculated. This case shows a status in which three units of "abc" are deleted, and it can be found that the similarity is not smaller than three. Therefore, no status parameter is generated. Furthermore, since no previous status exists, the possibility of the occurrence of skip is not calculated. As a result, the status parameter corresponding to the first unit "a" of the database is only the parameter (1, 0, 0).

Subsequently, when "c" is read out from the database in step SS2, first of all, the possibility that the unit will coincide with the third unit "c" of the search key is calculated. In this case, the possibility of first coincidence at the unit "c" through deletion of "ab" of the search key and the possibility of continuous coincidence from the portion of coincidence in the previous status, i.e., the possibility that the unit "a" will show coincidence, the unit "b" will be deleted and the unit "c" will show coincidence are there. However, as one of the minimized similarity, only the latter possibility is stored as a status parameter (3, 1, 0). Further, the possibility of the occurrence of skip without making the unit "c" coincident is calculated from the status parameter that expresses the previous status, and a status parameter (1, 0, 1) is stored.

Further, the unit "b" of the database is subjected to the same process in step SS3, and thereafter the unit "e" is read out. In this case, since no unit corresponding to the search key exists, the possibility of the occurrence of skip is calculated. It is to be noted that, when the above-mentioned parameter updating second process is executed on each of the previous status parameters (3, 1, 1), (2, 1, 0) and (1, 0, 2), they become status parameters (3, 1, 2), (2, 1, 1) and (1, 0, 3), respectively. However, the similarities expressed by the respective status parameters are 3, 2 and 3, and therefore, only the second status parameter (2, 1, 1) within the range of the threshold value of two of the predetermined similarity is stored (step SS4).

By repeating the above-mentioned processes, and at a point of time when the eighth unit "a" in the database is read out, a status parameter (4, 1, 0) is calculated (step SS8). This indicates the existence of a unit string that coincides with the units up to the fourth unit of the search key at the similarity of one. It can be found that a similarity of not greater than two results with respect to the entire search key comprised of five units, whatever the ninth unit in the database is. Consequently, this is outputted as a search success.

Simulation

Figure 17:
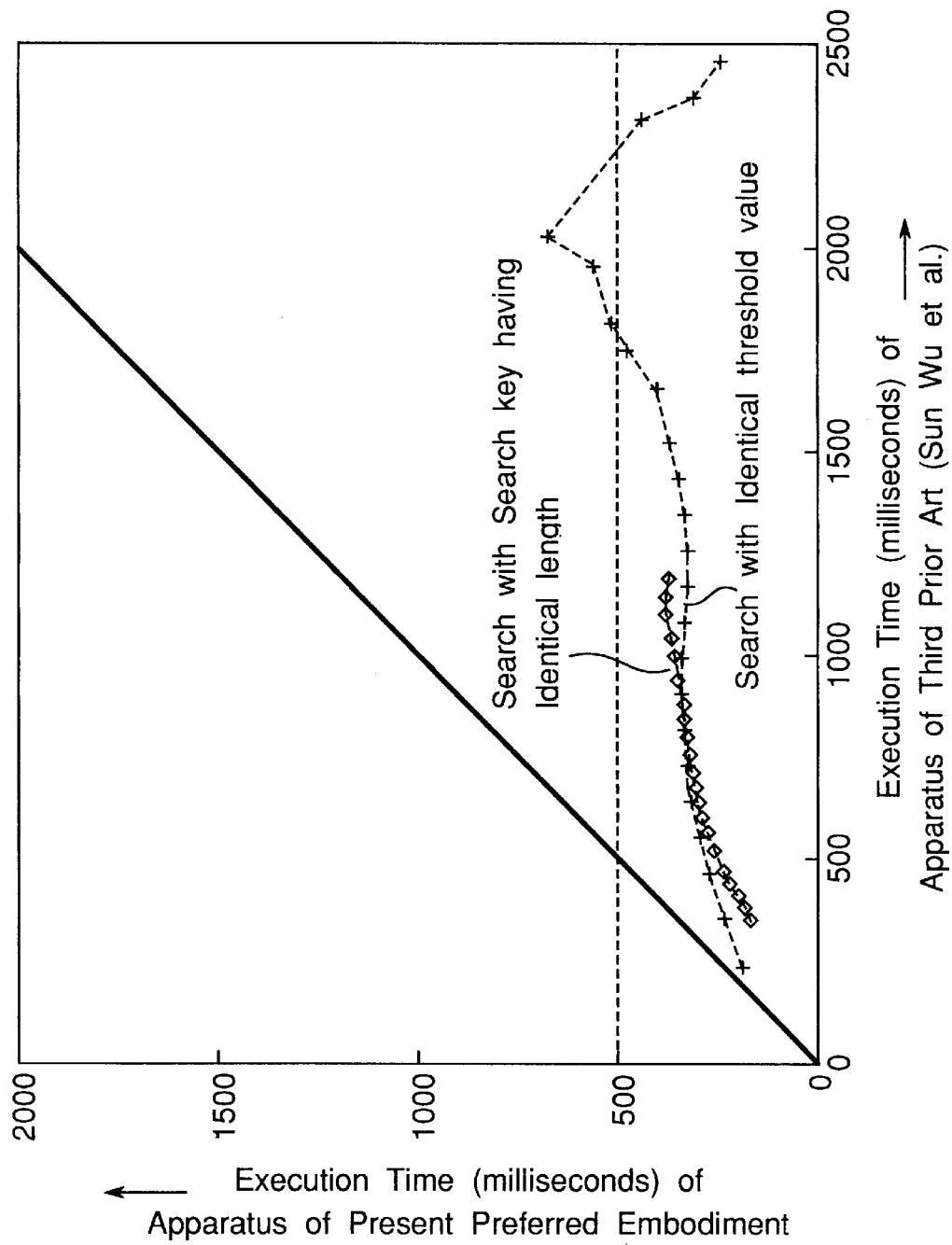
FIG. 17 is a graph showing a comparison of an execution time of the similarity search apparatus shown in FIG. 1 with an execution time of a similarity search apparatus according to the third prior art method.

Through a simulation or experiment for comparison with the algorithm enumerated as the prior art, a searching speed equal to or greater than it was able to be measured. An example of the measurement is shown in FIG. 17. FIG. 17 is a graph showing a comparison of an execution time of the similarity search apparatus of the preferred embodiment of the present invention with an execution time of the similarity search apparatus of the third prior art method. The axis of abscissas represents the execution time of the similarity search apparatus of the third prior art method, and the axis of ordinates represents the execution time of the similarity search apparatus of the present preferred embodiment. Further, the dots in FIG. 17 are provided by plotting the times that have been taken for search by the apparatuses under the same conditions. In this case, in particular, an English word dictionary was selected as the object of search, each of the words in the dictionary is searched with a combination of a possible similarity (being not smaller than one and smaller than the length of the search key) and a plurality of weights (by means of weights of 0 to 5 for each of deletion, insertion and replacement), and the execution times were measured. A curve with marks ◇ in FIG. 17 is obtained by averaging the execution times of search by "a search key having an identical length" and arranging them in order of length. A curve with marks+in FIG. 17 is obtained by averaging the execution times of search by "an identical threshold value" and arranging them in order of threshold value. Further, the line indicated by a solid line represents the place where the execution times of the two apparatuses are equal to each other.

As apparent from FIG. 17, the actual data are plotted under the solid line, and this tells that the similarity search apparatus of the present preferred embodiment operates more speedily than the similarity search apparatus of the third prior art method. In particular, when the search key and the threshold value are great, deletion of the number of statuses in the midway status produces a great effect, and therefore, it can be found that the speed has been increased remarkably in comparison with the prior art similarity search apparatus.

Figure 18:
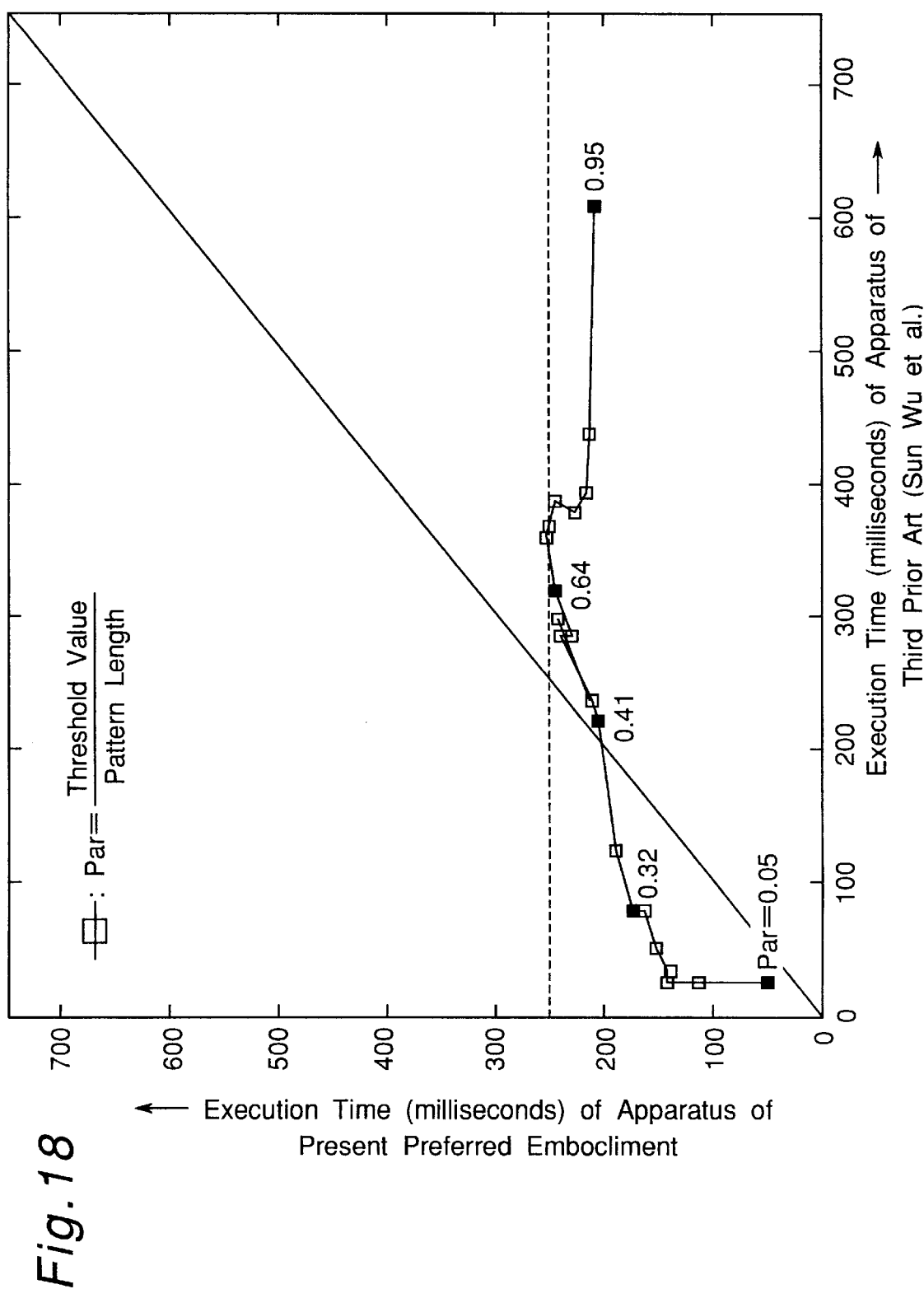
FIG. 18 is a graph showing a further comparison of an execution time of the similarity search apparatus shown in FIG. 1 with an execution time of a similarity search apparatus according to the third prior art method.

Another example of measurement is shown in FIG. 18. FIG. 18 is a graph showing a comparison of an execution time of the similarity search apparatus of the preferred embodiment of the present invention with an execution time of the similarity search apparatus of the third prior art method. The axis of abscissae represents the execution time of the similarity search apparatus of the third prior art method. The axis of ordinates represents the execution time of the similarity search apparatus of the present preferred embodiment. Further, the dots in FIG. 18 are provided by plotting the times that have been taken for search by the apparatuses under the same conditions. In this case, in particular, an English word dictionary was selected as the object of search, the same as used in experiment reported in FIG. 17. Each of the words in the dictionary is searched with a possible similarity (being not smaller than one and smaller than the length of the search key). On the contrary to the experiment in FIG. 17, all weights for each of deletion, insertion and replacement are equal to 1. A curve with marks □ is obtained by averaging the execution times of search by "a search key having an identical ratio of threshold value over search key length" and arranging them in order of ratio of threshold value over search key length. Further, the line indicated by a solid line represents the place where the execution times of the two apparatuses are equal to each other. Moreover, the line indicated by a dashed line represents the place where the execution times of the similarity search apparatus of the preferred embodiments is 250 milliseconds.

As apparent from FIG. 18, the actual date are plotted above the solid line for values of ratio of threshold value over search key length not greater than 0.4 and are plotted above the solid line for values of ratio of threshold value over search key length greater than 0.4, and this tells us that the similarity search apparatus of the present preferred embodiment operates more speedily than the similarity search apparatus of the third prior art method as soon as the ratio of threshold value over search key length is greater than 0.4. In particular, when the threshold value is greater than 0.4 times the search key length, deletion of the number of statuses in the midway status produces a great effect, and therefore, it can be found that the speed has been increased remarkably in comparison with the prior art similarity search apparatus for those value of threshold values and of pattern lengths which have a ratio greater than 0.4.

Further, as apparent from FIG. 18, actual date are plotted approximately along the dashed line for values of ratio of threshold value over search key length between the values of 0.4 and 0.96, extending from the values of 220 milliseconds to 610 milliseconds along the axis of abscissae, and extending from the values of 204 milliseconds to 253 milliseconds along the axis of ordinates, and this tells us that the similarity search apparatus of the present preferred embodiment operates at a time which is almost constant for values of ratio of threshold value over search key length greater than 0.4, whereas the similarity search apparatus of the third prior art method operates at a time growing accordingly to the ratio of threshold value over search key length. In particular, when the threshold value is of a value greater than 0.4 times the pattern length, deletion of the number of statuses in the midway status produces a great effect, and therefore, it can be found that the speed is almost not affected by a change in the ratio of threshold value over search key length for those values of threshold values and of pattern lengths which have a ratio greater than 0.4, on the contrary to the prior art similarity search apparatus.

According to the similarity search apparatus of the present preferred embodiment as described above, every time the units are read out one by one from the database memory 3 by the search section 5, the table stored in the unit position correspondence memory 10 is referred to so as to generate a status parameter and update the status parameter stored in the status parameter memory 4. Further, upon detecting the unit string coincident at a similarity equal to or lower than the inputted similarity, the unit string is outputted as a unit string of similarity. Accordingly, there is no limitation on the types of search key, and therefore, it can be easily expanded to the similarity search of Japanese and a word string.

Furthermore, according to the similarity search apparatus of the present preferred embodiment, only when a status parameter expressing a status in which the unit read out from the database and a unit in the search key coincide with each other, by comparing the maximum value of the similarity calculated from the position and similarity expressed by the newly generated status parameter and the length of the search key with the inputted threshold value, the existence of the unit string coincident at a similarity equal to or lower than the inputted similarity is detected. Therefore, outputting as a consequence of success of search can be effected without checking the search key to the last part of it. With this arrangement, the similarity search process can be executed at a higher speed than that of the prior arts.

Furthermore, according to the similarity search apparatus of the present preferred embodiment, the search section 5 suppresses generation of any unnecessary status parameter based on a predetermined condition every transition of the status with the reading-out of the units from the database, and the table stored in the unit position correspondence storage means is referred to so as to generate the status parameter and update the status parameter stored in the status parameter storage means. Accordingly, any status parameter that has no chance of coincidence is deleted in an early stage to reduce the number of statuses to be calculated, and therefore, a search can be achieved at a higher speed than that of the prior arts.

Modified Preferred Embodiments

In the above-mentioned preferred embodiments, the number of operations of deletion, insertion and replacement is used without modification as the definition of distance of edition to be used as the similarity. However, the present invention is not limited to this, and it is acceptable to set weights every type of operation so as to be defined the distance. Also in the similarity search apparatus of the present preferred embodiment, it is acceptable to introduce weight calculation into the portion of similarity calculation, thereby allowing weighted similarity search to be achieved.

As described above, according to one aspect of the present invention, there is provided a similarity search apparatus for searching a unit string whose similarity defined by a minimum number of editing operations for a predetermined unit becomes a value of not greater than an inputted threshold value with respect to an inputted search key, comprising:

unit position correspondence storage means for storing therein a table expressing an ordinal number among units at which each unit in the inputted search key has appeared within the search key;

preprocessing means for analyzing the inputted search key, generating said table and storing the table into said unit position correspondence storage means;

database storage means for storing therein a database including a plurality of units;

status parameter storage means for storing therein a plurality of status parameters each of which includes a similarity, a position of coincidence and a skip number, which express with what number of units from the top of the search key the units in the database have coincided at what degree of similarity, and express how many units in said database have been skipped over subsequently; and search means for generating said status parameter with reference to the table stored in said unit position correspondence storage means every time the units are read out one by one from said database storage means, updating the status parameters stored in said status parameter storage means and, upon detecting a unit string coincident at a similarity equal to or lower than an inputted similarity, outputting the detected unit string as a unit string of similarity.

Accordingly, there is no limitation on the types of search key, and therefore, it can be easily expanded to the similarity search of Japanese and a word string.

In the above-mentioned similarity search apparatus, the search means preferably detects the existence of a unit string coincident at a similarity equal to or lower than the inputted similarity by operating only when a status parameter expressing a status in which a unit read out from said database coincides with a unit in the search key is generated to compare a maximum value of similarity calculated from a position and a similarity expressed by a newly generated status parameter and a length of the inputted search key with an inputted threshold value.

Therefore, outputting as a consequence of success of search can be effected without checking the search key to the last part thereof. With this arrangement, the similarity search process can be executed at a higher speed than that of the prior arts.

In the above-mentioned similarity search apparatus, the search means preferably suppresses generation of any unnecessary status parameter based on a predetermined condition every transition of status through reading out the units one by one from said database, generates said status parameter with reference to the table stored in said unit position correspondence storage means, and updates the status parameters stored in said status parameter storage means.

Accordingly, any status parameter that has no chance of coincidence is deleted in an early stage to reduce the number of statuses to be calculated, and therefore, the search process can be achieved at a higher speed than that of the prior arts.

In the above-mentioned similarity search apparatus, the search means generates only a status parameter of which sum of the similarity and the skip number does not exceed a predetermined threshold value.

Accordingly, any status parameter that has no chance of coincidence is deleted in an early stage to reduce the number of statuses to be calculated, and therefore, the search process can be achieved at a higher speed than that of the prior arts.

In the above-mentioned similarity search apparatus, the search means generates only a status parameter whose similarity is minimized when a plurality of status parameters of which position of coincidence is identical and skip number is zero can be generated.

Accordingly, any status parameter that has no chance of coincidence is deleted in an early stage to reduce the number of statuses to be calculated, and therefore, the search process can be achieved at a higher speed than that of the prior arts.

In the above-mentioned similarity search apparatus, when a unit subsequent to a coincident unit in a search key in a status previous to a status of a current process coincides with a unit subsequent to a unit in said database, said search means does not execute updating of the status parameter by insertion.

Accordingly, any status parameter that has no chance of coincidence is deleted in an early stage to reduce the number of statuses to be calculated, and therefore, a search can be achieved at a higher speed than that of the prior arts.

In the above-mentioned similarity search apparatus, the unit string is a letter string and each unit constituting said unit string is one letter, and otherwise, the unit string is a word string and each unit constituting said word string is one word.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A similarity search apparatus for searching a unit string whose similarity defined by a minimum number of editing operations for a predetermined unit becomes a value of not greater than an inputted threshold value with respect to an inputted search key, comprising:

unit position correspondence storage means for storing therein a table expressing an ordinal number among units at which each unit in the inputted search key has appeared within the search key;

preprocessing means for analyzing the inputted search key, generating said table and storing the table into said unit position correspondence storage means;

database storage means for storing therein a database including a plurality of units;

status parameter storage means for storing therein a plurality of status parameters each of which includes a similarity, a position of coincidence and a skip number, which express with what number of units from the top of the search key the units in the database have coincided at what degree of similarity, and express how many units in said database have been skipped over subsequently; and search means for generating said status parameter with reference to the table stored in said unit position correspondence storage means every time the units are read out one by one from said database storage means, updating the status parameters stored in said status parameter storage means and, upon detecting a unit string coincident at a similarity equal to or lower than an inputted similarity, outputting the detected unit string as a unit string of similarity.

2. The similarity search apparatus as claimed in claim 1, wherein said search means detects the existence of a unit string coincident at a similarity equal to or lower than the inputted similarity by operating only when a status parameter expressing a status in which a unit read out from said database coincides with a unit in the search key is generated to compare a maximum value of similarity calculated from a position and a similarity expressed by a newly generated status parameter and a length of the inputted search key with an inputted threshold value.

3. The similarity search apparatus as claimed in claim 2, wherein said search means suppresses generation of any unnecessary status parameter based on a predetermined condition every transition of status through reading out the units one by one from said database, generates said status parameter with reference to the table stored in said unit position correspondence storage means, and updates the status parameters stored in said status parameter storage means.

4. The similarity search apparatus as claimed in claim 3, wherein said search means generates only a status parameter of which sum of the similarity and the skip number does not exceed a predetermined threshold value.

5. The similarity search apparatus as claimed in claim 4, wherein said search means generates only a status parameter whose similarity is minimized when a plurality of status parameters of which position of coincidence is identical and skip number is zero can be generated.

6. The similarity search apparatus as claimed in claim 4, wherein, when a unit subsequent to a coincident unit in a search key in a status previous to a status of a current process coincides with a unit subsequent to a unit in said database, said search means does not execute updating of the status parameter by insertion.

7. The similarity search apparatus as claimed in claim 3, wherein said search means generates only a status parameter whose similarity is minimized when a plurality of status parameters of which position of coincidence is identical and skip number is zero can be generated.

8. The similarity search apparatus as claimed in claim 3, wherein, when a unit subsequent to a coincident unit in a search key in a status previous to a status of a current process coincides with a unit subsequent to a unit in said database, said search means does not execute updating of the status parameter by insertion.

9. The similarity search apparatus as claimed in claim 2, wherein said unit string is a word string and each unit constituting said word string is one word.

10. The similarity search apparatus as claimed in claim 2, wherein said unit string is a letter string and each unit constituting said unit string is one letter.

11. The similarity search apparatus as claimed in claim 1, wherein said search means suppresses generation of any unnecessary status parameter based on a predetermined condition every transition of status through reading out the units one by one from said database, generates said status parameter with reference to the table stored in said unit position correspondence storage means, and updates the status parameters stored in said status parameter storage means.

12. The similarity search apparatus as claimed in claim 11, wherein said search means generates only a status parameter of which sum of the similarity and the skip number does not exceed a predetermined threshold value.

13. The similarity search apparatus as claimed in claim 12, wherein said search means generates only a status parameter whose similarity is minimized when a plurality of status parameters of which position of coincidence is identical and skip number is zero can be generated.

14. The similarity search apparatus as claimed in claim 12, wherein, when a unit subsequent to a coincident unit in a search key in a status previous to a status of a current process coincides with a unit subsequent to a unit in said database, said search means does not execute updating of the status parameter by insertion.

15. The similarity search apparatus as claimed in claim 12, wherein said unit string is a letter string and each unit constituting said unit string is one letter.

16. The similarity search apparatus as claimed in claim 12, wherein said unit string is a word string and each unit constituting said word string is one word.

17. The similarity search apparatus as claimed in claim 11, wherein said search means generates only a status parameter whose similarity is minimized when a plurality of status parameters of which position of coincidence is identical and skip number is zero can be generated.

18. The similarity search apparatus as claimed in claim 11, wherein, when a unit subsequent to a coincident unit in a search key in a status previous to a status of a current process coincides with a unit subsequent to a unit in said database, said search means does not execute updating of the status parameter by insertion.

19. The similarity search apparatus as claimed in claim 11, wherein said unit string is a letter string and each unit constituting said unit string is one letter.

20. The similarity search apparatus as claimed in claim 11, wherein said unit string is a word string and each unit constituting said word string is one word.

21. The similarity search apparatus as claimed in claim 1, wherein said unit string is a letter string and each unit constituting said unit string is one letter.

22. The similarity search apparatus as claimed in claim 1, wherein said unit string is a word string and each unit constituting said word string is one word.

* * * * *